US007571353B2

(12) United States Patent  (10) Patent No.: US 7,571,353 B2
Largman et al.  (45) Date of Patent: *Aug. 4, 2009

(54) SELF-REPAIRING COMPUTING DEVICE AND METHOD OF MONITORING AND REPAIR

(75) Inventors: Kenneth Largman, San Francisco, CA (US); Anthony B. More, Oakland, CA (US); Jeffrey Blair, San Francisco, CA (US)

(73) Assignee: Vir2us, Inc., Sausalito, CA (US)

( * ) Notice: Subject to any disclaimer, the term of this patent is extended or adjusted under 35 U.S.C. 154(b) by 279 days.

This patent is subject to a terminal disclaimer.

(21) Appl. No.: 11/358,660

(22) Filed: Feb. 16, 2006

(65) Prior Publication Data

US 2006/0143530 A1  Jun. 29, 2006

Related U.S. Application Data

(63) Continuation of application No. 10/090,480, filed on Feb. 27, 2002, now Pat. No. 7,111,201, which is a continuation-in-part of application No. 09/862,898, filed on May 21, 2001, now Pat. No. 6,880,110, and a continuation-in-part of application No. 10/075,136, filed on Nov. 19, 2001, now Pat. No. 7,096,381, and a continuation-in-part of application No. 10/074,686, filed on Feb. 11, 2002, now Pat. No. 7,100,075.

(60) Provisional application No. 60/205,531, filed on May 19, 2000, provisional application No. 60/220,282, filed on Jul. 24, 2000, provisional application No. 60/291,767, filed on May 17, 2001.

(51) Int. Cl.
G06F 11/00 (2006.01)

(52) U.S. Cl. ................................ 714/36; 714/23; 713/2
(58) Field of Classification Search .................. 714/23, 714/36, 57; 713/2, 100
See application file for complete search history.

(56) References Cited

U.S. PATENT DOCUMENTS 4,464,747 A  8/1984  Groudan et al.

(Continued)

FOREIGN PATENT DOCUMENTS

WO  WO 95/22794  8/1995

(Continued)

OTHER PUBLICATIONS

The International Search report for PCT application PCT/US06/013343 Search Report dated Nov. 7, 2007.

(Continued)

*Primary Examiner*—Christopher S McCarthy
(74) *Attorney, Agent, or Firm*—Perkins Coie LLP

(57) ABSTRACT

The invention may backup, maintain backups, or recover data associated with a computing system. The computing system may include any number of components including hardware and software, and any memory accessible to the computing system. The computing system may focus on a user computing system and potentially the supporting environment which stabilizes the functionality of the user computing system (e.g., operating system, BIOS, etc.). Typically data associated with the computing system is identified by a variety of characteristics, the data is stored as a backup, and subsequently data within the backup may be restored or used to evaluate an existing computing system.

25 Claims, 13 Drawing Sheets

U.S. PATENT DOCUMENTS

| | | | |
|---|---|---|---|
| 4,939,694 | A | 7/1990 | Eaton et al. |
| 5,434,562 | A | 7/1995 | Reardon |
| 5,655,069 | A | 8/1997 | Ogawara et al. |
| 5,704,031 | A | 12/1997 | Mikami et al. |
| 5,732,268 | A | 3/1998 | Bizzarri |
| 5,737,118 | A | 4/1998 | Sugaya et al. |
| 5,764,878 | A | 6/1998 | Kablanian et al. |
| 5,826,012 | A | 10/1998 | Lettvin |
| 5,841,712 | A | 11/1998 | Wendell et al. |
| 5,860,001 | A | 1/1999 | Cromer et al. |
| 5,894,551 | A | 4/1999 | Huggins et al. |
| 5,920,515 | A | 7/1999 | Shaik et al. |
| 5,969,632 | A | 10/1999 | Diamant et al. |
| 5,974,549 | A | 10/1999 | Golan |
| 6,009,518 | A | 12/1999 | Shiakallis |
| 6,016,553 | A | 1/2000 | Schneider et al. |
| 6,067,618 | A | 5/2000 | Weber |
| 6,088,794 | A | 7/2000 | Yoon et al. |
| 6,178,452 | B1 | 1/2001 | Miyamoto |
| 6,199,178 | B1 | 3/2001 | Schneider et al. |
| 6,202,153 | B1 | 3/2001 | Diamant et al. |
| 6,205,527 | B1 | 3/2001 | Goshey et al. |
| 6,268,789 | B1 | 7/2001 | Diamant et al. |
| 6,289,426 | B1 | 9/2001 | Maffezzoni et al. |
| 6,301,657 | B1 | 10/2001 | Jones et al. |
| 6,317,845 | B1 | 11/2001 | Meyer et al. |
| 6,327,653 | B1 | 12/2001 | Lee |
| 6,347,375 | B1 | 2/2002 | Reinert et al. |
| 6,367,042 | B1 | 4/2002 | Phan et al. |
| 6,374,366 | B1 | 4/2002 | Maffezzoni |
| 6,381,694 | B1 | 4/2002 | Yen |
| 6,421,792 | B1* | 7/2002 | Cromer et al. ............... 714/36 |
| 6,457,069 | B1 | 9/2002 | Stanley |
| 6,477,629 | B1 | 11/2002 | Goshey et al. |
| 6,577,920 | B1 | 6/2003 | Hypponen et al. |
| 6,640,317 | B1 | 10/2003 | Snow |
| 6,691,230 | B1 | 2/2004 | Bardon |
| 6,697,950 | B1 | 2/2004 | Ko |
| 6,754,818 | B1 | 6/2004 | Lee et al. |
| 6,880,110 | B2 | 4/2005 | Largman et al. |
| 7,096,381 | B2 | 8/2006 | Largman et al. |
| 7,100,075 | B2 | 8/2006 | Largman et al. |
| 7,111,201 | B2 | 9/2006 | Largman et al. |
| 7,111,202 | B2* | 9/2006 | Cagle et al. ............... 714/36 |
| 7,137,034 | B2 | 11/2006 | Largman et al. |
| 7,206,971 | B2* | 4/2007 | Zeller et al. ............... 714/36 |
| 2002/0004908 | A1 | 1/2002 | Galea |
| 2002/0053044 | A1 | 5/2002 | Gold et al. |
| 2002/0078366 | A1 | 6/2002 | Raice |
| 2002/0087855 | A1 | 7/2002 | Dykes et al. |
| 2002/0095557 | A1 | 7/2002 | Constable et al. |
| 2002/0169998 | A1 | 11/2002 | Largman et al. |
| 2002/0174137 | A1 | 11/2002 | Wolff et al. |
| 2003/0105973 | A1 | 6/2003 | Liang et al. |
| 2004/0083369 | A1 | 4/2004 | Erlingsson et al. |
| 2004/0210796 | A1 | 10/2004 | Largman et al. |
| 2004/0236874 | A1 | 11/2004 | Largman et al. |
| 2004/0255165 | A1 | 12/2004 | Szor |
| 2004/0268361 | A1 | 12/2004 | Schaefer |
| 2005/0010670 | A1 | 1/2005 | Greschler et al. |
| 2005/0060722 | A1 | 3/2005 | Rochette et al. |
| 2005/0149726 | A1 | 7/2005 | Joshi et al. |
| 2006/0020858 | A1 | 1/2006 | Schaefer |
| 2006/0020937 | A1 | 1/2006 | Schaefer |
| 2006/0137013 | A1 | 6/2006 | Lok |
| 2006/0143514 | A1 | 6/2006 | Largman et al. |
| 2006/0272017 | A1 | 11/2006 | Largman et al. |
| 2006/0277433 | A1 | 12/2006 | Largman et al. |

FOREIGN PATENT DOCUMENTS

| | | |
|---|---|---|
| WO | WO 95/22794 A1 | 8/1995 |
| WO | WO 02/21274 | 3/2002 |
| WO | WO 02/099642 | 12/2002 |
| WO | WO 03/073208 A2 | 9/2003 |
| WO | WO 03/075158 A2 | 9/2003 |
| WO | WO 03/075158 A3 | 9/2003 |
| WO | WO 03/073208 A3 | 11/2003 |
| WO | WO 03/096169 A2 | 11/2003 |
| WO | WO 03/104954 A2 | 12/2003 |
| WO | WO 03/104954 A3 | 12/2003 |
| WO | WO 2004/012416 A2 | 2/2004 |
| WO | WO 2004/012416 A3 | 2/2004 |
| WO | WO 2005/043360 A1 | 5/2005 |

OTHER PUBLICATIONS

Garfinkel, Tal et al., "Flexible OS Support and Applications for Trusted Computing," Feb. 2003 or later, 6 pgs.

Garfinkel, Tal and Mendel Rosenblum, "A Virtual Machine Introspection Based Architecture for Intrusion Detection," Dec. 2002 or later, 16 pgs.

Garfinkel, Tal, "Traps and Pitfalls: Practical Problems in System Call Interposition Baesd Security Tools," Nov. 2002 or later, 14 pgs.

Sapuntzakis, Constantine et al., "Optimizing the Migration of Virtual Computers," Dec. 2002 or newer, 14 pgs.

Garfinkel, Tal et al., "Terra: A Virtual Machine-Based Platform for Trusted Computing," SOSP'03, Oct. 19-22, 2003, Bolton Landing, NY, © 2003 ACM, 14 pgs.

Lam, Monica et al., "The Collective: A Virtual Appliance Computing Infrastructure," http://suif.Stanford.edu/collective/index.html, Jan. 27, 2006, 3 pgs.

Messmer, Ellen, "GreenBorder offers security 'barrier' for IE, Outlook," Mar. 23, 2005, Computerworld, © 2005 Network World, Inc., www.computerworld.com/securtiytopics/security/story/0,10801,100579,00.html, Jan. 27, 2006, 4 pgs.

Schmidt, Brian K. et al., "The Interactive Performance of SLIM: a Stateless, Thin-Client Architecture," 17th ACM Symposium on Operating Systems Principles (SOSP'99), Published as *Operating Systems Review*, 34(5):32-47, Dec. 1999, SOSP-17, Dec. 1999, Kiawah Island, SC, © 1999 ACM, 16 pgs.

Schmidt, Brian K., "Supporting Ubiquitous Computing with Stateless Consoles and Computation Caches," Aug. 2000, 140 pgs.

Collection of printouts from GreenBorder website, © 2004-2006 GreenBorder Technologies, Inc., www.greenborder.com, Jan. 27, 2006, 36 pgs.

"Whitepaper: iSolation Server v.2," 2005, Avinti, Inc., Lindon, UT, 15 pgs.

"iSolation Server FAQ," © 2003-2006 Avinti, Inc., www.avinti.com/downloads/isolation-server-faq.html, Jan. 27, 2006, 4 pgs.

Avinti, "iSolation Server v.2 Whitepaper," © 2003-2006 Avinti, Inc., www.avinti.com/downloads/isolation-server-whitepaper.html, Jan. 27, 2005, 15 pgs.

Elrad, Tzilla et al., "Developing Secure Applications Through Aspect-Oriented Programming," Nov. 18, 2004, 27.1 Introduction, 27.2 The Domain of Application-Level Security, 27.3 An Experience Report, 27.4 Discussion, 27.5 Related Work, 27.6 Conclusion, Acknowledgements, References, © 2003-2006 Pearson Education, Addison-Wesley Professional, Sample Chapter begins at www.awprofessional.com/articles/article.asp?p=340869&seqNum=1, 29 pgs.

"Server and Domain Isolation Using Ipsec and Group Policy," Mar. 17, 2005, © 2006 Microsoft Corporation, www.Microsoft.com/technet/security/topics/architectureanddesign/ipsec/default.mspx, 4 pgs.

Grizzard, Julian B. et al. "Towards an Approach for Automatically Repairing Compromised Network Systems," Jun. 2004 or later, 4 pgs.

Zeichick, Alan, "Isolation and Protection: Intel's LaGrande Vision for Trusted Virtualization," Nov. 22, 2005, www.devx.com/Intel/Article/30008, Jan. 27, 2006, 4 pgs.

Sapuntzakis, Constantine and Monica S. Lam, "Virtual Appliances in the Collective: A Road to Hassle-Free Computing," May 2003 or later, 6 pgs.

Chandra, Ramesh et al., "The Collective: A Cache-Based System Management Architecture," Presented at the $2^{nd}$ Symposium on Networked Systems Design and Implementation, May 2-4, 2005, Boston MA, 14 pgs.

Chow, Jim et al., "Understanding Data Lifetime via Whole System Simulation," Aug. 2003 or later, 16 pgs.

Ruwase, Olatunji and Monica S. Lam, "A Practical Dynamic Buffer Overflow Detector," Jun. 2003 or later, 11 pgs.

Garfinkel, Tal et al., "Ostia: A Delegating Architecture for Secure System Call Interposition," Aug. 2003 or later, 15 pgs.

Sapuntzakis, Constantine et al., "Virtual Appliances for Deploying and Maintaining Software," Jun. 2003 or later, 15 pgs.

Brumley, David and Dan Boneh, "Remote Timing Attacks are Practical," 2003 or later 13 pgs.

Li, Ninghui et al., "Obvious Signature-Based Envelope," PODC'03, Jul. 13-16, 2003, Boston, MA, p. 182-189, © 2003 ACM, 8 pgs.

Microsoft Corporation Microsoft Windows 95 Resource Kit, 1995, Microsoft Press, pp. 650-651.

* cited by examiner

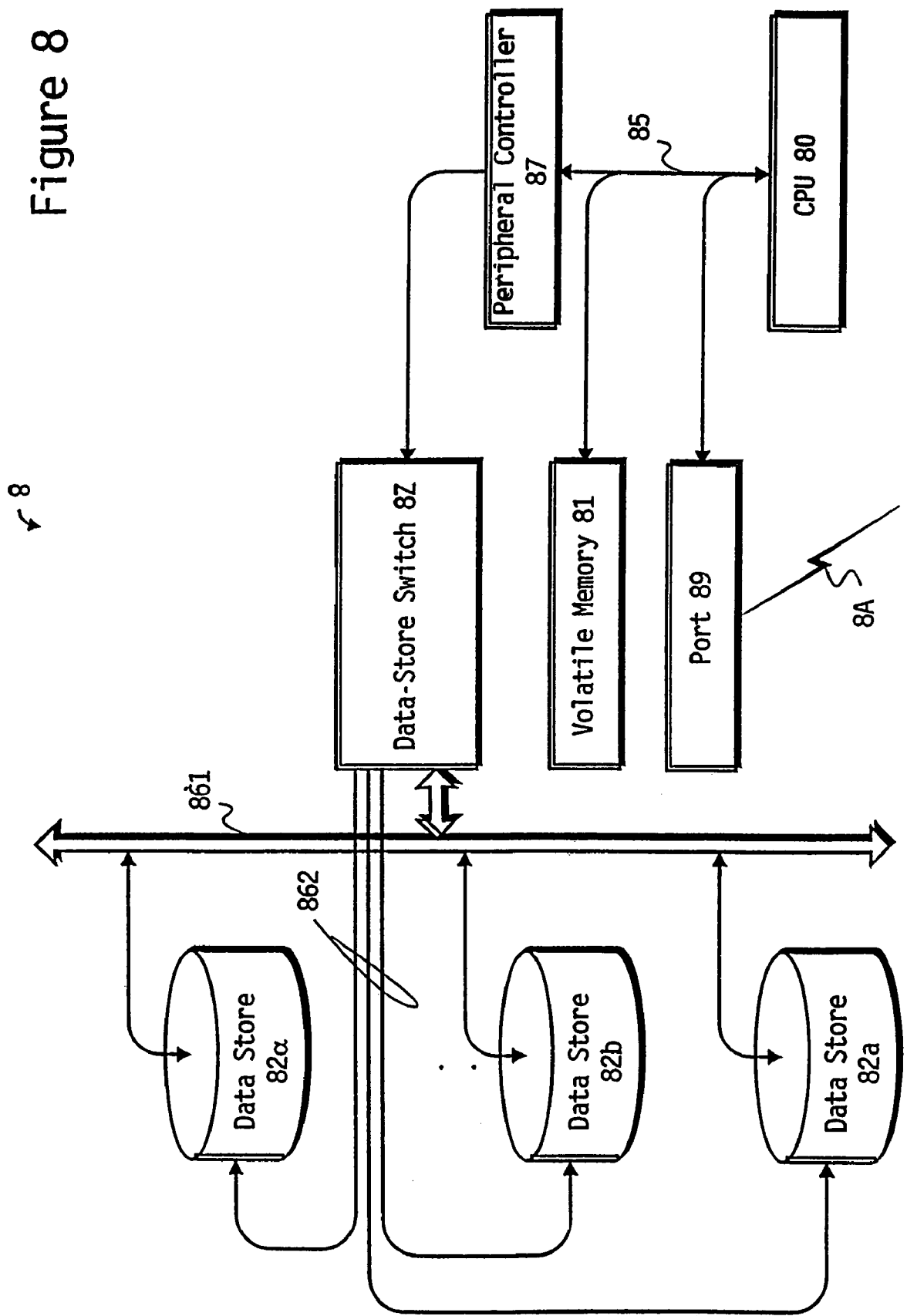

SELF-REPAIRING COMPUTING DEVICE AND METHOD OF MONITORING AND REPAIR

RELATED AND BENEFIT APPLICATIONS

This application is a continuation of and claims the benefit of priority under 35 U.S.C. 120 to U.S. patent application Ser. No. 10/090,480 filed 27 Feb. 2002 and now U.S. Pat. No. 7,111,201, entitled "Self Repairing Computer Detecting Need for Repair and Having Switched Protected Storage" which application and issued patent are incorporated by reference herein; and, which is a continuation-in-part and claims the benefit of priority under 35 U.S.C. 119(e) and/or 35 U.S.C. 120 to:

U.S. patent application Ser. No. 09/862,898, entitled, "A Computer with Switchable Components," filed May 21, 2001, naming Kenneth Largman. and Anthony B. More and Jeffrey Blair as inventors, and commonly assigned to Self Repairing Computers, Inc., San Francisco, Calif.;

U.S. patent application Ser. No. 10/075,136, entitled, "On-The-Fly Repair Of A Computer," filed Nov. 19, 2001, naming Kenneth Largman and Anthony B. More and Jeffrey Blair as inventors, and under an obligation of assignment to Self Repairing Computers, Inc., San Francisco, Calif.;

U.S. patent application Ser. No. 10/074,686, entitled, "External Repair Of A Computer," filed Feb. 11, 2002, naming Kenneth Largman and Anthony B. More and Jeffrey Blair as inventors, and under an obligation of assignment to Self Repairing Computers, Inc., San Francisco, Calif.;

U.S. Provisional Patent Application No. 60/291,767, entitled, "A Self-Repairing Computer," filed May 17, 2001, naming Kenneth Largman and Anthony B. More as inventors, and commonly assigned to Self Repairing Computers, Inc., San Francisco, Calif.;

U.S. Provisional Patent Application No. 60/205,531, entitled, "Scalable, Diagnostic, Repair and Multi-Use System for Computing Hardware & Devices that Utilize Computer Hardware," filed May 19, 2000, naming Kenneth Largman and Anthony More as inventors, and commonly assigned to Self-Repairing Computers, Inc. of San Francisco, Calif.;

U.S. Provisional Patent Application No. 60/220,282, entitled, "Scalable, Diagnostic, Repair and Multi-Use System for Computing Hardware & Devices That Utilize Computer Hardware," filed Jul. 24, 2000, naming Kenneth Largman and Anthony More as inventors, and commonly assigned to Self-Repairing Computers, Inc. of San Francisco, Calif.; and

FIELD OF THE INVENTION

This invention relates to computers, computer repair and computer architecture. More particularly, the invention relates to a computer architecture and software that enables the computer to repair itself.

BACKGROUND

Personal-computer manufacturers and sellers often offer via-telephone and on-site repair services. Yet purchasers—particularly home, home-office and small-office purchasers—readily complain that their service contract offers less service than they expected. For example, a computer seller may dispatch a technician only after the purchaser calls the help center, performs a number of tests under the direction of the help center, escalates the problem at the telephone help center and performs redundant or additional tests under the direction of a putatively more knowledgeable telephone-help staff. The purchaser may have to escalate the problem still further and perform additional redundant tests before a repair technician is dispatched.

Frequently, the help center directs the customer to cycle the power on the computer, to re-boot the computer, to detach and reattach peripherals in question and to re-install application and operating-system software. Each call to the help center and each level of escalation may require the purchaser to cycle, re-boot, detach and reattach.

Detaching and reattaching peripherals can be extremely inconvenient. USB devices, for example, typically attach at the back of a computer in a location difficult to reach. In any event, the non-digerati purchaser may fear disassembling his computer, worrying that he may damage the computer further.

Help centers even direct a customer to reformat the boot drive of the computer and re-install operating-system and application software. Re-formatting is an onerous task for several reasons. Firstly, the home, home-office and small-office user rarely reformats a drive in the normal operation of his computer and is unfamiliar with the process itself. Secondly, reformatting destroys all the data on the drive, and such a user understandably becomes anxious on finding out that he will lose all of his data. Thirdly, such a user may not retain the application or operating-system installation media, especially where the seller pre-installs the software. The user may have been unsure which media to keep, or intending to keep a particular media, is in fact unable to locate that media later when needed.

Fourthly, the user typically does not back up his drives as often as an information technologist would recommend. That he will have to rely on his back ups (if any) if he is to have any hope of restoring his application is then not a comforting thought.

Accordingly, the art evinces a need for a computer that reduces or even eliminates the need for a user to call a help line, to keep installation media, to attach and reattach peripherals at the port, etc. Indeed, a computer that reduces or eliminates the technical savvy its user needs to effect repairs is desirable.

These and other goals of the invention will be readily apparent to one of ordinary skill in the art on reading the background above and the description below.

BRIEF DESCRIPTION OF THE DRAWINGS

FIG. 6A illustrates the enabling of a data store in conjunction with the defeat of access to a communications link. FIG. 6B illustrates the enabling of a data store in order to support access to the communications link.

FIG. 7A illustrates the computer in its Network Disconnected state, while FIG. 7B illustrates the computer in its Network Connected state.

FIG. 8 illustrates a computer incorporating an embodiment of the invention.

SUMMARY

Herein are taught apparatus and methods for a computer to repair itself.

A method or system for supporting a computer systems self repair, including the computer executed steps for booting from a first boot device, and booting from a second boot device in response to a signal indicating a need for repair. While booted from the second boot device the computer system is capable of repairing software on the first boot device. The signal may effect a logical or physical switch. Repairing software may be performed in part by copying, template, backup or archive software from a device other than the first boot device. Repairing software may be performed automatically without direction by a user or according to preset preferences.

DESCRIPTION OF THE INVENTION

Overview

An example of the invention in use follows: A user runs an application on a computer incorporating an embodiment of the invention. At some point, the user modifies the application or underlying operating system to the point that the application, the operating system or both become unusable. Indeed, the user may no longer be able to even boot the operating system.

Recognizing that the computer needs to be repaired, the user throws a switch on the computer. The computer fixes the malfunctioning software and so informs the user.

The user can then re-boot the computer. On re-booting, the user again has access to a correctly functioning operating system, application and data files.

A Self-Repairing Computer

Figure 1:
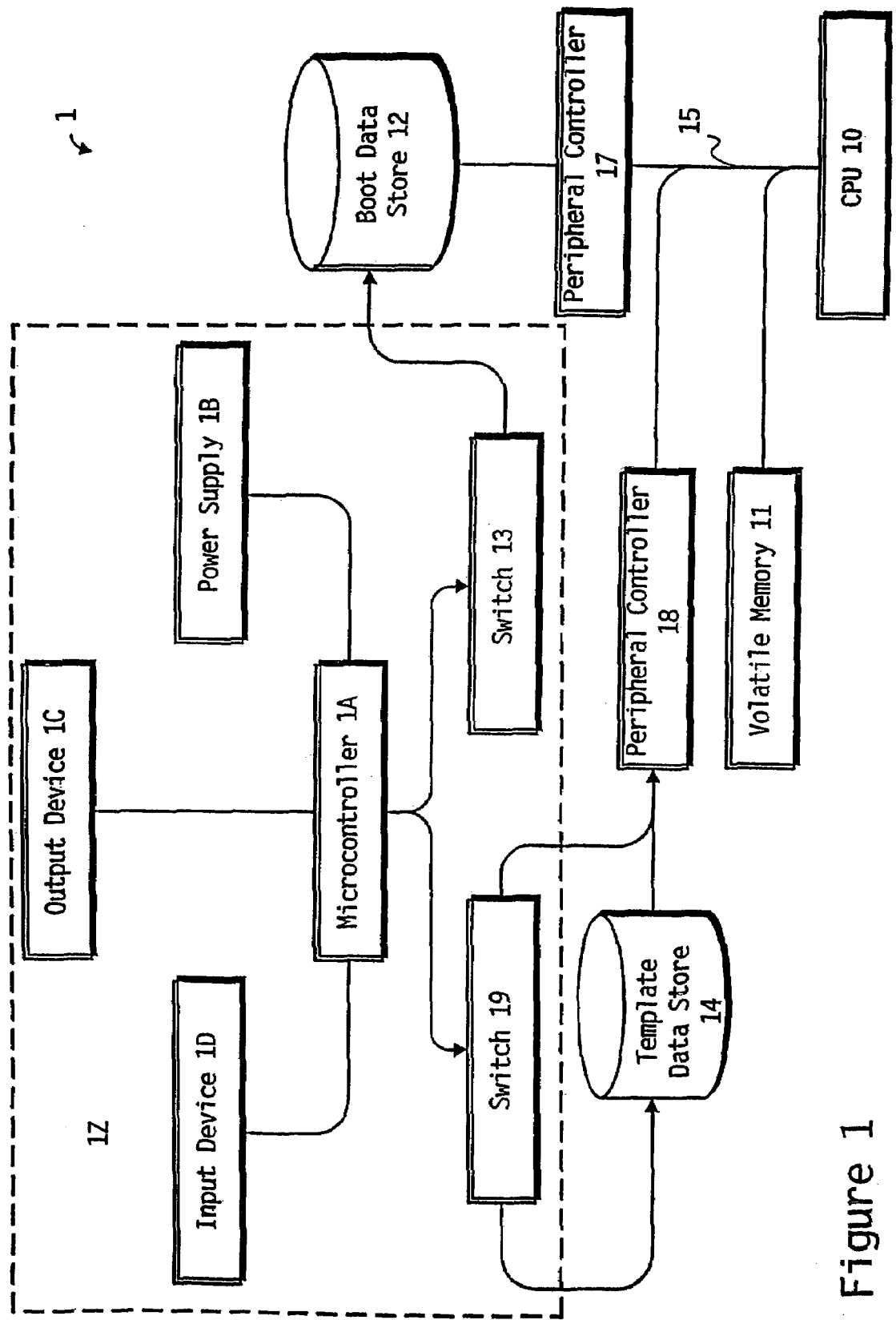
FIG. 1 illustrates a computer incorporating an embodiment of the invention.

FIG. 1 illustrates a computer 1 incorporating an embodiment of the invention. The computer 1 may include a CPU 10, volatile memory 11, peripheral controllers 17, 18, a first non-volatile data store 12 and a bus 15, all well known in the art.

The computer 1 may also include switches 13, 19, a second non-volatile data store 14, a controller 1A, a power supply 1B, an output device 1C and an input device 1D.

The bus 15 may communicatively couple the volatile memory 11 and the peripheral controllers 17, 18 to each other and to the CPU 10. The peripheral controllers 17, 18 may communicatively couple with the data stores 12, 14, respectively.

The switches 13, 19, the controller 1A, power supply 1B, output device 1C and input device 1D may form a data-store switch 1Z. A data-store switch may alter the accessibility of a connected data store according to the setting of the switch.

The controller 1A may communicatively couple with the switches 13, 19, the output device 1C and the input device 1D. The power supply 1B may supply the controller 1A (and other switch components) with power. More particularly, the power supply 1B may power the controller 1A independently of the power to the rest of the computer 1.

Figure 10:
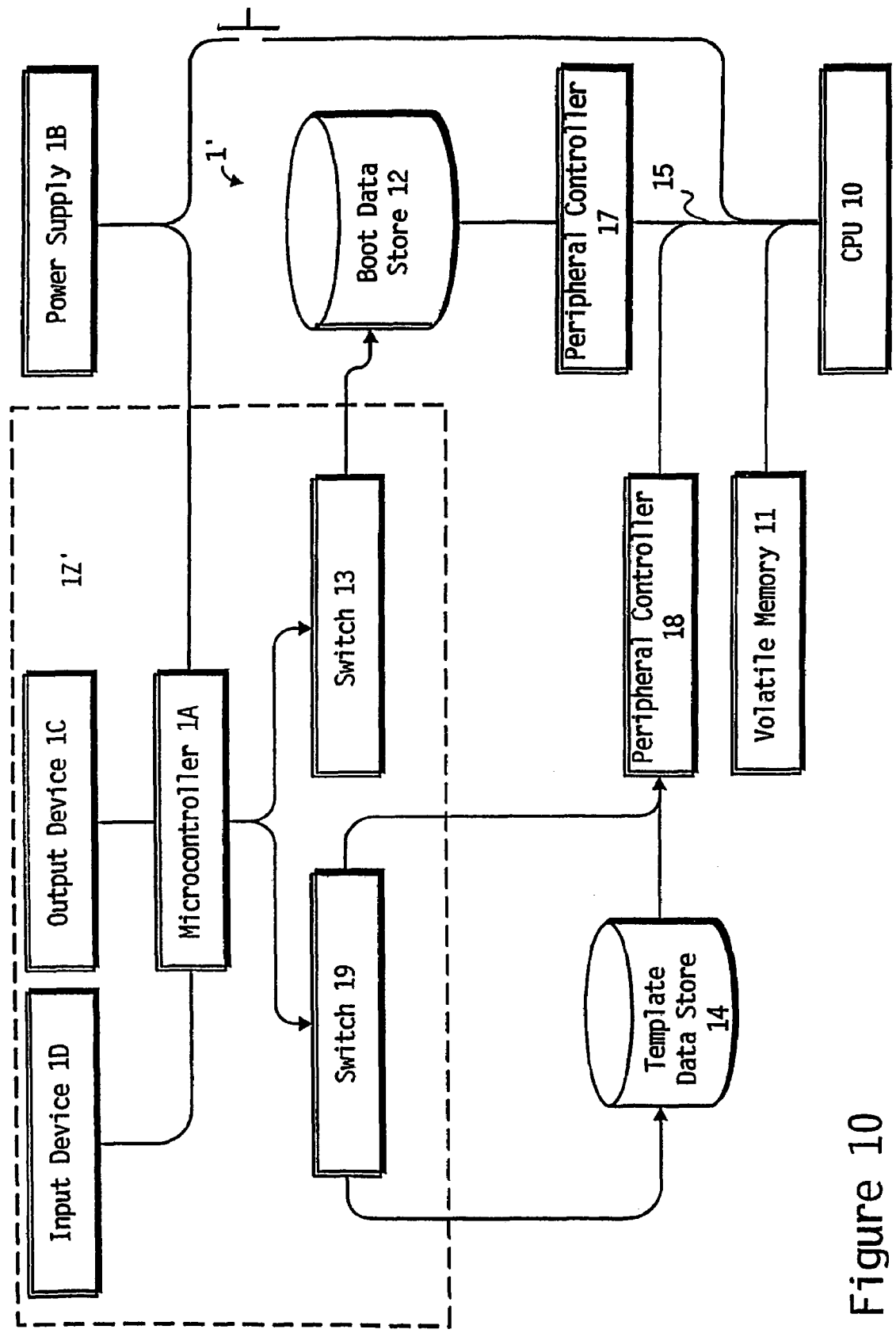
FIG. 10 illustrates a computer incorporating an embodiment of the invention.

The power to the switch 1Z may come from the same source as the power for the rest of the computer (the wall outlet or laptop battery, for example). The switch 1Z may then be powered from that supply even when the rest of the computer 1 is not. FIG. 10 illustrates this embodiment of the invention.

The switch 13 may communicate with the data store 12. The switch may control (toggle, for example) the identification settings of the data store 12.

The switch 19 may couple to the data store 14. The switch 19 may control (toggle, for example) the power to the data store 14.

The volatile memory 11 may be random-access memory. The data stores 12, 14 may be magnetic disks, for example.

The output device 1C may be the monitor of the computer 1, LEDs or an LCD distinct from the monitor, for example.

Figure 2:
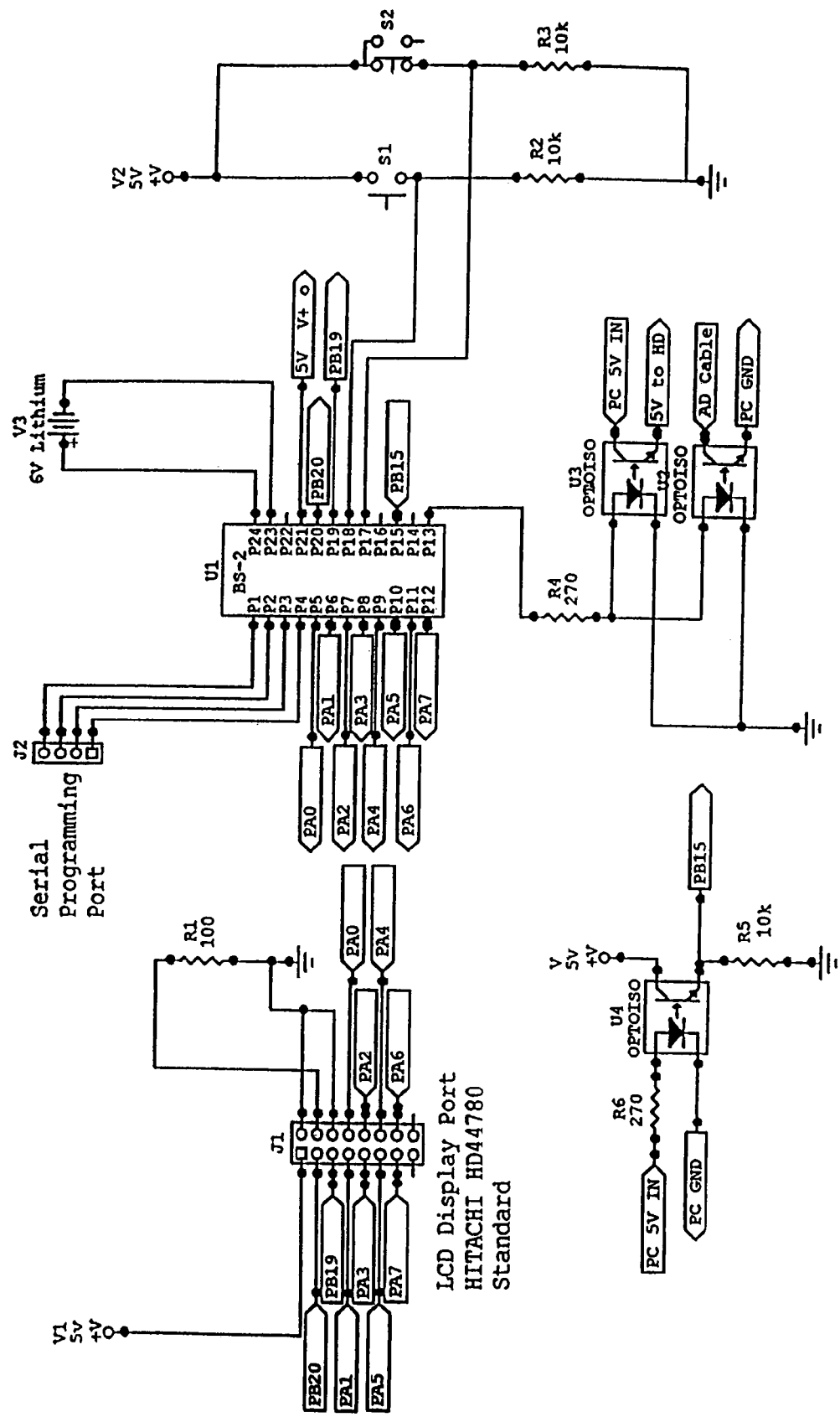
FIG. 2 is a schematic of a data-store switch according to an embodiment of the invention.

FIG. 2 is a schematic of the data-store switch 1Z according to an embodiment of the invention. In FIG. 2, the opto-isolators U2, U3 implement the switches 13, 19, respectively. The Basic Stamp II microcontroller U1 (from Parallax, Inc., Rocklin, Calif.) implements the controller 1A. The battery V3 implements the power supply 1B. The LCD display port J1 represents the output device 1C, and the switches S1, S2 implement the input device 1D. (Opto-isolator U4 detects whether the computer 1 has power.)

In a first mode of operation herein termed "normal mode," the computer 1 may run a predetermined operating system and application. Accordingly, the data store 12 may contain a correctly functioning copy of that software. The CPU 10 may access the data store 12, boot the operating system and then execute that application.

The data store 12 is termed herein the "boot data store." The data store 12 may contain a bootable, executable operating system and executable application.

The data-store switch 1Z may make the data store 12 accessible to the computer 1 as the boot drive (by means of the switch 13, for example). The data-store switch 1Z may also make the data store 14 inaccessible to the computer 1 (by means of the switch 19, for example). Otherwise, the data-store switch 1Z may idle, waiting for user input on the device 1D.

In the normal stage, the computer 1 may perform as a conventional computer. The user may run his application software, inattentive to the invention incorporated into the computer 1.

In a third mode of operation herein termed the "repair mode," the CPU 10 may run software on the data store 14 and the controller 1A may execute a program in parallel. A mode intermediate to the normal and repair modes, herein termed the "switching mode," may effect the transition from normal to repair mode.

Figures 3A, 3B:
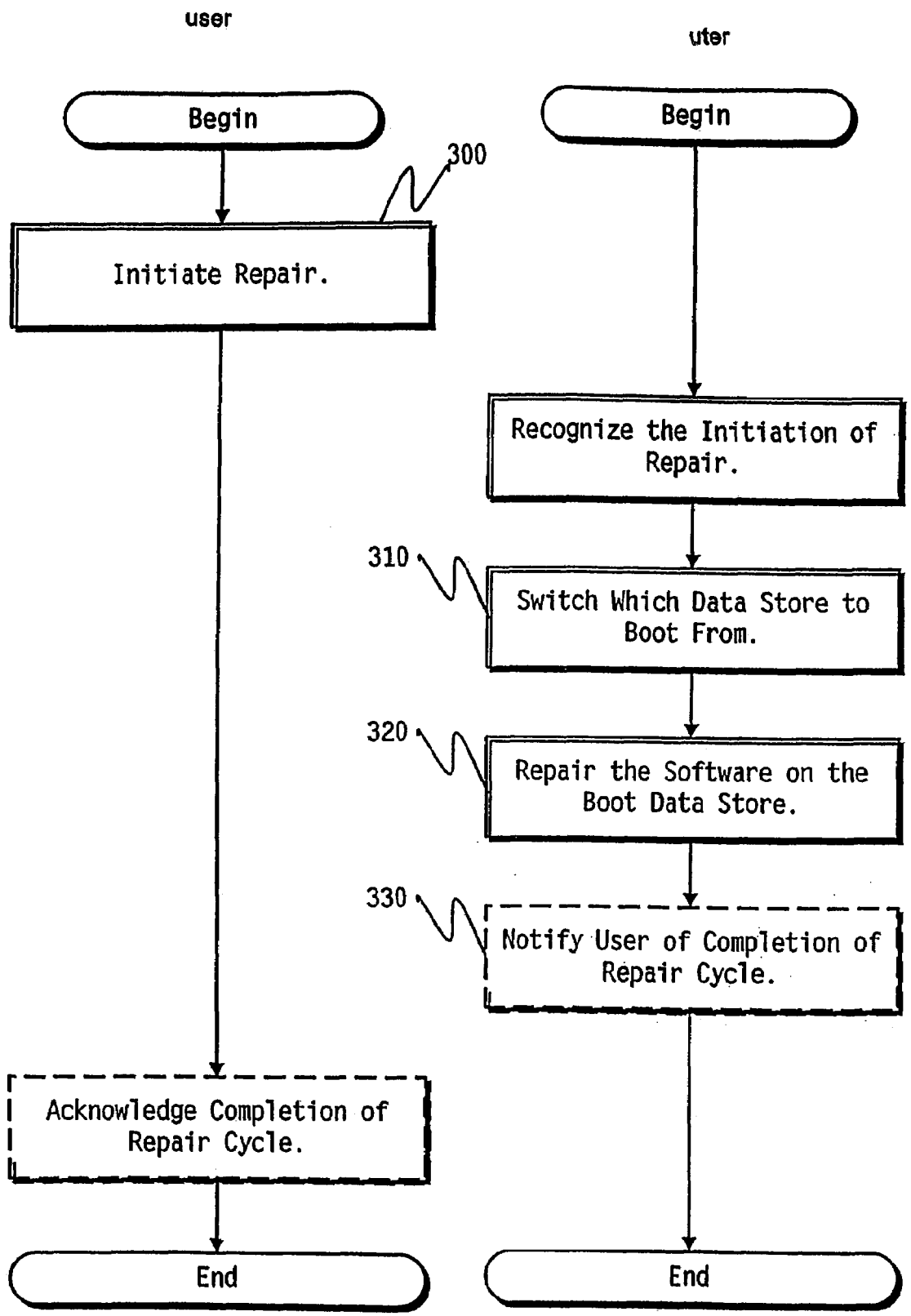
FIGS. 3A through 3B illustrate the switch-and-repair process according to one embodiment of the invention.

In the switching mode, using an input device such as the device 1D the user may indicate that he wishes to repair software on the data store 12. (FIGS. 3A and 3B illustrate the switch-and-repair process according to one embodiment of the invention.) In response to the input, the computer 1 may switch from normal operation to repair, step 310, and repair the software on the data store 12, step 320.

The switching of a data store may be logical or physical. Logical switching is switching enforced purely by software. For example, software may set one or more predetermined bits that it or other software tests to determine whether a data store is accessible at any given time.

A physical switch opens or closes a predetermined electrical circuit of a device to be switched. A physical switch may, for example, alter the open/close state of identification jumpers of a data store. A physical switch may turn on or off the power supply to a device to be switched.

Figure 4:
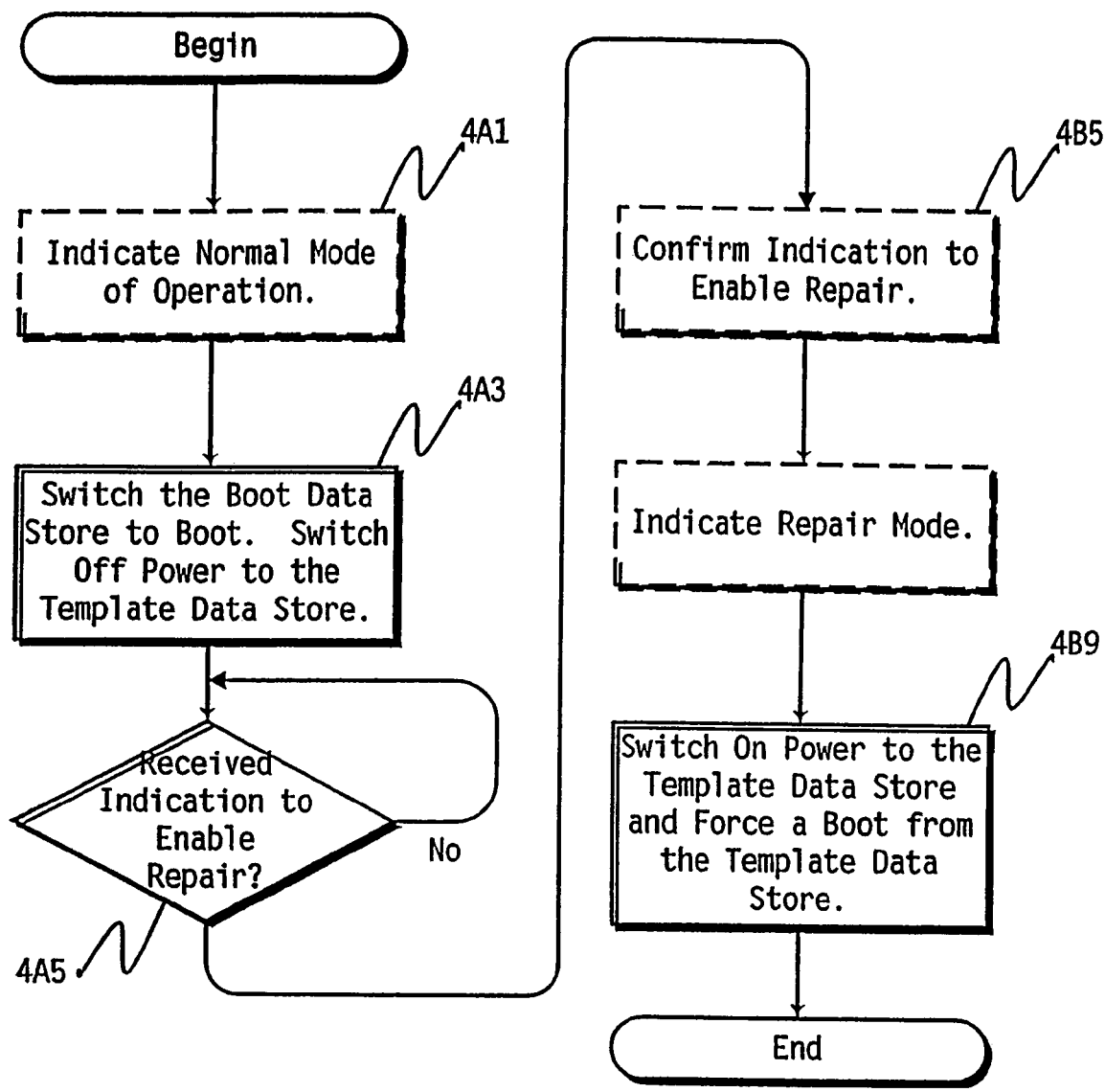
FIG. 4 illustrates the flow of control in a data-store switch according to one embodiment of the invention.

FIG. 4 illustrates the flow of control in a data-store switch 1Z according to one embodiment of the invention. On start up, the data-store switch 1Z may go into normal mode of operation. In this stage, the switch 1Z may set the switch 13 to make the data store 12 the boot drive, step 4A3. The switch also may set the switch 19 to leave the template data store 14 unpowered.

The data-store switch 1Z may then idle, waiting for the user to initiate the switch to repair mode, step 4A5. The data-store switch 1Z may display a message indicating that it is in normal mode, step 4A1.

When the data-store switch 1Z receives an indication to switch to repair mode, the switch 1Z may ask the user to confirm this indication, step 4B5. Confirmation is preferable where the repair process is destructive before it is constructive. Confirmation is preferable also because the activation of the input device indicating the switch to repair mode may have been accidental or ill considered.

On confirmation if requested, the data-store switch 1Z may switch power to the data store 14, step 4B9, making the data store 14 accessible to the computer 1. The data store 14 may be permanently configured to be addressable as the boot drive when it is accessible. Accordingly, the address of the data store 12 may then change.

In normal operation, the data store 12 may be addressable as the boot drive. However, during the switch, the switch 1Z may change the identity (address jumpers, for example) of the data store 12 to something other than the boot-drive identity.

The computer 1 is now ready to enter the repair stage.

Switched physically to repair mode, the computer 1 may boot from the template boot drive. The booted program or some other program executed during the boot sequence (autoexec.bat, for example, on machines running Windows™ operating system from Microsoft Corp., Redmond, Wash.) may query the user.

In one embodiment, on rebooting the computer 1 may automatically repair the data drive 12. It copies software from the template data store 14 to the data store 12 without further direction from the user. Previously set user preferences may, however, direct the course of repair.

Thus, where the template data store 14 contains only application software, the repair process may copy over or re-install that application software from the template data store 12. Where the template data store contains operating-system and application software, the repair process may copy over or re-install the operating system first and then the application software.

Uninstallation or deletion of an application may precede re-installation or copying over of that software. Re-formatting of the data store 12 may precede re-installation or copying over of the operating system. Resetting of ROM-resident parameters may precede re-installation or copying over of operating-system or application software.

On completion of the repair, the repair software may direct the user to switch back to normal mode and re-boot the computer 1.

Alternatively, the repair process may be menu-driven. The repair process may present the user a sequence of options to determine what repair process to execute. For example, on re-boot in repair mode, the repair software may offer the choices of running the repair process, reviewing repair-process settings, updating the template software (the application, operating system or repair-process software itself) and quitting the repair process.

The template data store 14 may contain application software, operating-system software and repair-process software. The application software may include the executable software itself (.exe, .dll, .o, etc.) or the files created by the application (.wpd files for Corel WordPerfect word-processing software, for example).

The software on a template data store 14 typically is an operating system and may include one or more applications, along with the underlying software to run the operating system (and any included application) on a computer with a predetermined configuration. The underlying software may include one or more boot records, one or more partition tables or a BIOS.

The template software is created by installing software onto a data store, by copying installed software onto the data store or by copying installation software onto a data store. (Installed software includes data files and other pre-existing software.)

The template data store software may be updated. Where the template software is installation-ready software, that installation software may be updated to a different, usually later, version. Where the template software is a backup of the software on the data store 12, a different, usually more recent, backup of the data-store software replaces or supplements that software.

Repair-process settings may include whether to recover data, run a virus check, reformat the data store, revert to a backup, run a human-mediated (i.e., manual) or an automatic repair, run diagnostics (software or hardware, for example). Repair-process settings may also include whether to format and at what level (quick versus low-level, for example), what software to re-install (operating system (OS) only; OS and executable-application software; OS, executable-application software and application data files; data files only, for example), whether to switch automatically (i.e., under program or hardware control), what level of repair to run (quick, better or best, in one embodiment), whence to setup (backup or template, in one embodiment) and whence to recover data files (most recent backup prior to repair, backup at the time of repair, other predetermined backup, query-and-response-specified backup, as examples).

The repair process may entail recovering a usable version of the appropriate data file. In some instances of computer repair, the problem is not so much with the operating-system or executable-application software so much as with the files (usually data files) associated with one or more of the applications. If the application in question is Microsoft Outlook, then the file to be recovered may be the mail-and-folder-data .pst file. Where the application is Microsoft's Internet Explorer, the file to recover may be the favorites file.

Running a virus check may entail first checking that the virus-check-and-repair software is up to date. Because new software attacks appear daily, and because newer malicious code has a higher chance of delivering a payload, this is not a trivial step. The software may then check for malicious code and repair software, as directed by the user or by default.

The above process presupposes that the data store 14 contains a copy of (a version of) the operating-system, application software or data file on the data store 12. In this sense, this second data store 14 is termed herein the "template data store." With the computer 1 switched to boot from the template data store 14, the computer 1 may perform the original copying of template software onto the data store 14. (Where the data store 14 is a read-only medium, it may arrive at the computer 1 in a pre-written state.)

An example of the operation of the computer 10 follows: Assume that the data store 12 contains a bootable Windows™ operating system (from Microsoft Corp., Redmond, Wash.). Assume also that the data store 12 also contains NaturallySpeaking® application software (Lernout & Hauspie, Ieper, Belgium and Burlington, Mass.).

The operating system and the application on the data store 12 may have each been run any number of times, and the user may have customized the operating system, the application or both to his preferences. In contrast, the template data store 14 may contain as-installed copies of the operating-system and the application software.

In the course of using his computer 1, the user puts the computer 1 into an undesirable state. He may, for example, foul up the optional settings of the operating system or application such that he cannot reset them to a usable state. He may download a virus, Trojan horse or other malicious code that changes his operating system, application or both. The particulars of the malicious code are unknown but the manifest effect is that the computer 1 is partially or completely inoperable. He may remove files critical to the correct operation of the software. As one of skill in the art will recognize, the ways in which software may be intentionally or unintentionally altered to the point of unusability are legion.

Recognizing that his computer 1 is in an undesirable state, the user activates the switch 13, step 300. FIG. 3 illustrates the switch-and-repair process according to one embodiment of the invention, and step 310 illustrates the actual switching. In response to the switch activation, step 300, the computer 1 repairs the software on the data store, step 320.

The repair process involves copying software from the template data store 14 to the data store 14. The software on the template data store 14 may be a master copy, a backup copy or an archive copy of software on the data store 12. (An archive is a copy of software, which copy cannot be overwritten or deleted.)

With template software on the template data store 14, the computer 1 may re-install or copy over software onto the data store 12. The computer 1 may overwrite all or part of any software on the data store 12.

The computer 1 may offer the user options as to how thorough its attempt to repair itself should be. In one embodiment, the computer 1 offers the options of a "Quick Repair," a "Better Repair," a "Best Repair" and a "Test." A Quick Repair may, for example, re-install or copy template software from the data store 14 onto the data store 12 without first re-formatting the data store 12. The Better Repair may perform a high-level re-format of the data store 12 before that copy or re-installation. A Best Repair may perform a low-level re-format of the data store 12 before copying over or re-installing software.

FIG. 4 illustrates the switch-and-repair process in more detail, according to one embodiment of the invention. The switching copies software from the template data store onto the data store, replacing the unusable software on the data store.

A number of situations occur where the computer 1 may effect repair without rebooting. For example, if only data files or application executables need to be repaired, then shutting down the operating system booted from the data store 12 is not usually necessary—especially in newer operating systems such as Windows 2000 (Microsoft) and more sophisticated operating systems such as Linux.

Further, a large number of operating-system files can be repaired (for example, by replacement) without shutting down the operating system. Repairing the operating system without rebooting is a preferred embodiment.

Still further, for backups (automated or otherwise), continuing to run from the data store already booted may be preferable. Where the computer 1 can become sufficiently quiescent that a backup from the data store 12 to the data store 14 can occur while still booted from the data store 12, then such a backup is quicker than shutting down and backing up the data store 12 while booted from the data store 14.

Where the data store 12 remains the boot drive when the data store 14 is simultaneously available, the data store 14 may be addressable as other than the boot drive. The address of the data store 14 may be switched similarly to the address switching of the data store 12.

A Virus and Hacker-Resistant Computer

Figure 6A:
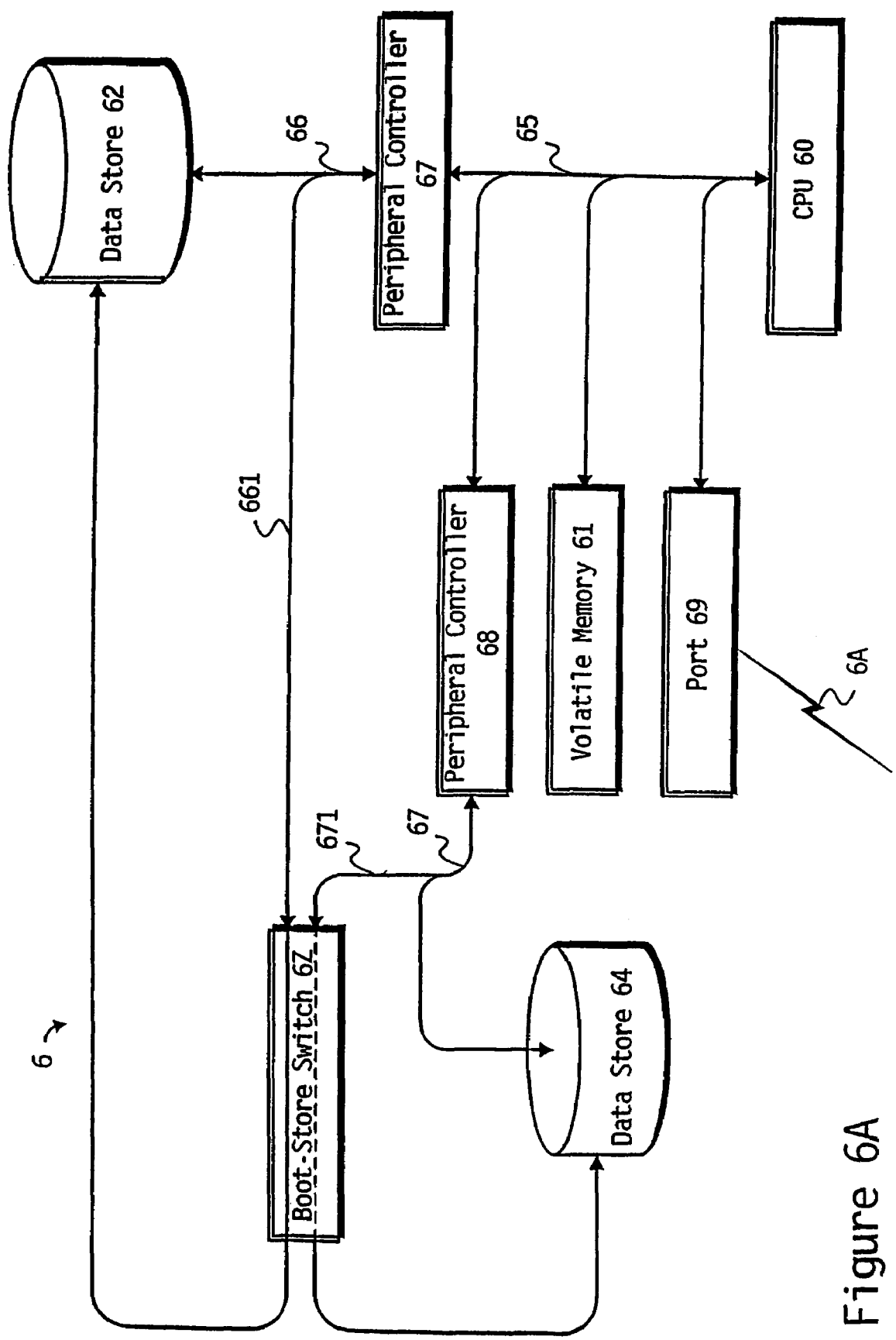
FIGS. 6A, 6B illustrate a computer incorporating an embodiment of the invention.

FIG. 6A illustrates a computer 6 incorporating an embodiment of the invention. The computer 6 may include a CPU 60, volatile memory 61, peripheral controllers 67, 68, first and second non-volatile data stores 62, 64, data port 69, communications link 6A and buses 65, 66, all well known in the art. The computer 6 may also include a data-store switch 6Z.

The bus 65 may communicatively couple the volatile memory 61, the peripheral controllers 67, 68 and the data port 69 to each other and to the CPU 60. The peripheral controllers 67, 68 may communicatively couple with the data stores 62, 64, respectively. The data port 69 may mediate access to the communications link 6A.

The bus 66 may communicatively and electrically couple the peripheral controller 67 to the data store 62 and to the boot-store switch 6Z. More specifically, the boot-store switch 6Z may switch the power line 661 of the bus 66, thus powering up or down the boot store 62.

Likewise, the bus 67 may communicatively and electrically couple the peripheral controller 68 to the data store 64 and to the boot-store switch 6Z. The boot-store switch 6Z may switch the power line 671 of the bus 66, powering up or down the boot store 64.

The port 69 may link the computer 6 to other devices such as a modems, networks, etc. as indicated by the communications link 6A.

The computer 6 may operate in two states: Connected and Disconnected. In the Disconnected state, the computer 6 does not use the data port 69 to communicate and the data-store switch may enable the data store 62.

By contrast, in the Connected state, the computer 6 may use the data port 69 to obtain data over the communications link 6A. In the Connected state, the switch may enable the second data store 64.

Thus, the computer 6 may enable only one of the multiple data stores 62, 64 at any given time, which depending on whether it is accessing the communications link 6A. This isolates data received over the communications link 6A to one of the data stores, namely, the data store 64. Where the data received was maliciously created (a virus or a hacking executable), this data is confined to the data store 64.

The switching of the data stores 62, 64 may be done under manual, hardware or software control. A mechanical throw switched by the user when the user wishes to access (or cease accessing) the communications link exemplifies a manual switch. A boot-store switch 6Z that responds programmatically to the CPU 60 illustrates a software-controlled switch.

For example, if the user boots an Internet browser and the communications link 6A is the Internet, then the CPU 60 may programmatically recognize the (intended) launch of a browser and initiate the switch of the data stores 62, 64. The switch may involve re-booting the computer 6 in order to make the second data store 64 the only data store available during the use of the communications link 6A. (A browser on the data store 64 may launch automatically on the boot from the data store 64.)

In one embodiment, the computer may synchronously switch the port 69 and the second boot store 64. This may improve the resistance of the computer 6 to hacking or infection.

FIG. 6A illustrates the enabling of the data store 62 in conjunction with the defeat of access to the communications link 6A. The solid line continuing the power line 661 through the boot-store switch 6Z illustrates the accessibility of the data store 62. Conversely, the dashed lined through the switch 6Z illustrates the inaccessibility of the data store 64.

Figure 6B:
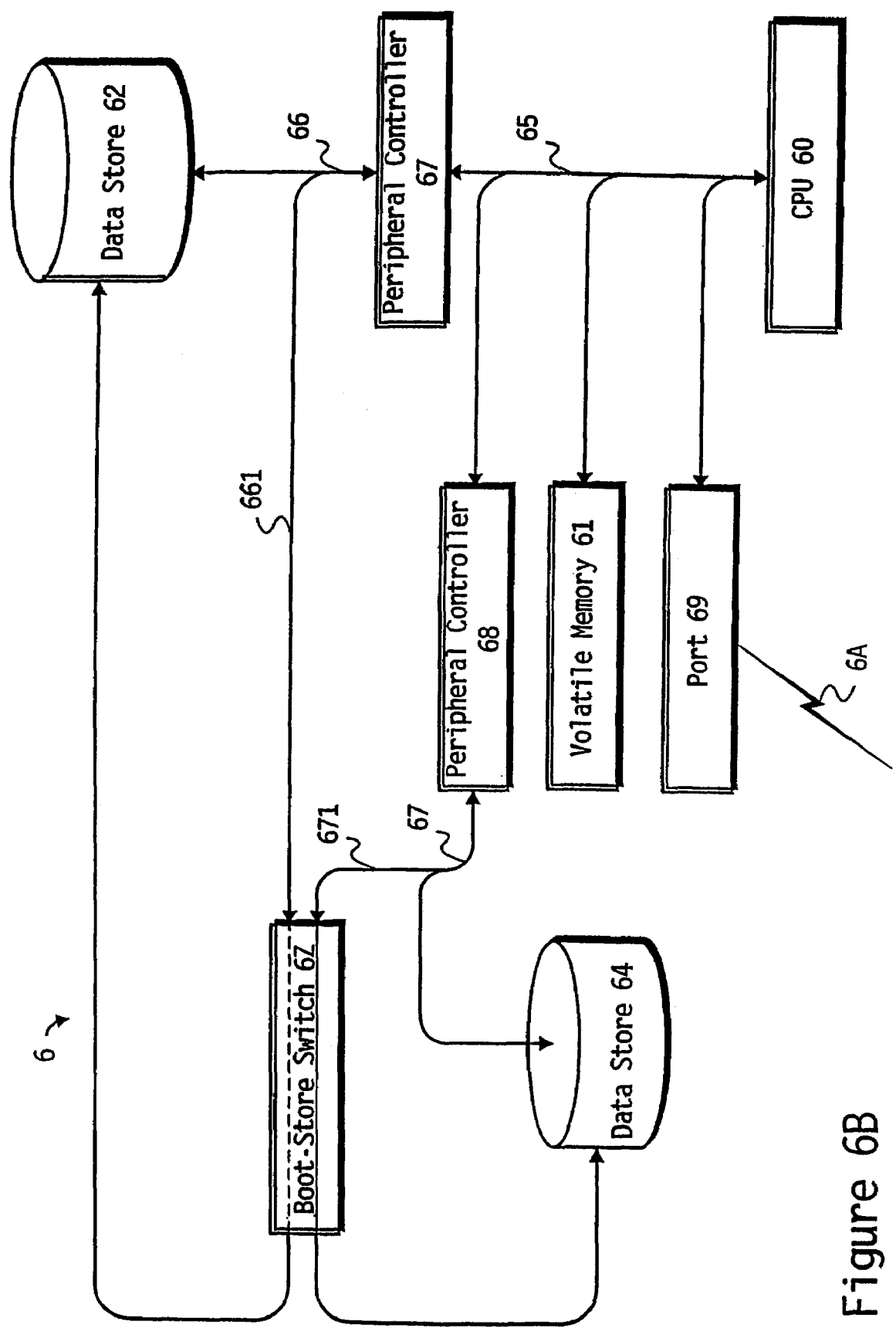

FIG. 6B illustrates the enabling of the data store 64 in order to support access to the communications link 6A. The solid power line through the boot-store switch 6Z illustrates the accessibility of the data store 64. Conversely, the dashed lined through the switch 6Z illustrates the inaccessibility of the data store 62.

The data store 64 may contain application software to process the data received over the link 6A. In such a setting the need to migrate the data on the data store 64 to the data store 62 may be minimal or non-existent.

Where, however, the application to process the data received over the link 6A and stored on the store 64 resides on the data store 62, then a process of migration is necessary. A predetermined time after receiving data over the link 6A, the computer may simultaneously enable the data stores 62, 64 and copy the data received to the data store 62 for processing there. The delay allows, for example, anti-virus software providers to produce and distribute security software addressing threats that have come to light since the time of receipt of the data.

The migration process may be manual or automatic.

A Lockable Network Computer

Figure 7A:
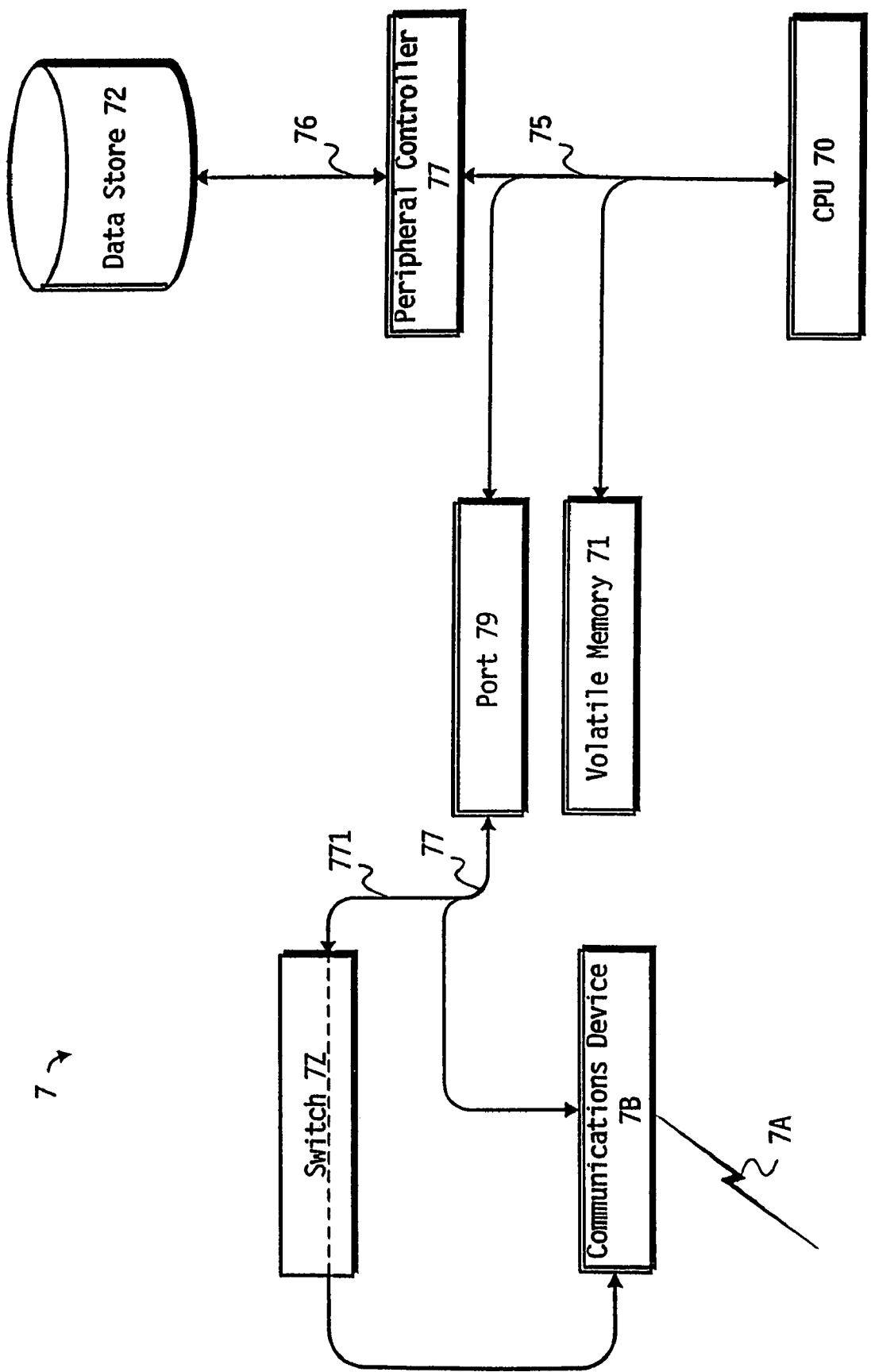
FIGS. 7A, 7B illustrate a computer incorporating an embodiment of the invention.

FIG. 7A illustrates a computer 7 incorporating an embodiment of the invention. The computer 7 may include a CPU 70, volatile memory 71, a peripheral controller 77, a non-volatile data store 72, a data port 79, a communications link 7A and buses 75, 77, all well known in the art. The computer 7 may also include a switch 7Z.

The bus 75 may communicatively couple the volatile memory 71, the peripheral controller 77 and the data port 79 to each other and to the CPU 70. The peripheral controller 77 may communicatively couple with the data store 72. The data port 79 may mediate access to the communications link 7A.

The bus 77 may communicatively or electrically couple the data port 79 to the communications device 7B.

The port 79 may link the computer 7 to other communicators through a communication device 7B and over a communications link 7A. Examples of the communications device 7B and link 7A include an acoustic modem 7B and a POTS telephone line 7A; a tap 7B and an Ethernet 7A; and a wireless modem 7B and radiation-permeable space 7A.

The switch 7Z may switch a power line 771 of the bus 77, thus powering up or down the communications device 7B. The switch 7Z may switch (tri-state, for example) a data line 771 of the bus 77, thus interrupting or enabling the ability of the communications device 7B to transfer data to the data port 79.

Figure 7B:
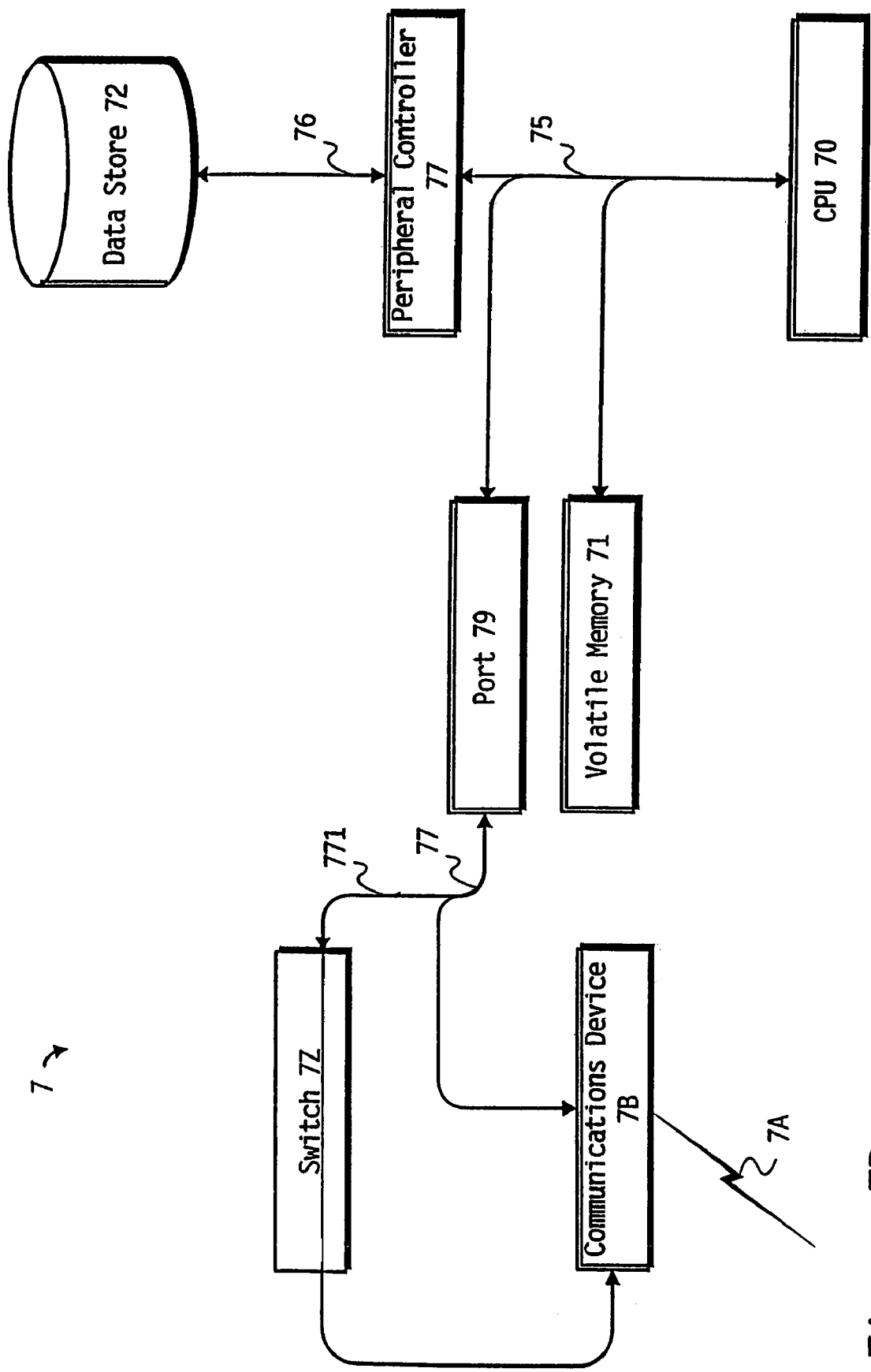

The computer 7 may operate in two states: Network Connected and Network Disconnected. FIG. 7A illustrates the computer 7 in its Network Disconnected state, while FIG. 7B illustrates the computer 7 in its Network Connected state. (The solid line continuing the power line 761 through the switch 7Z illustrates the continuity of the power or data line 771, and dashed lined through the switch 7Z illustrates the discontinuity of that line 771.

In the Network Disconnected state, the switch 7Z may disconnect the communications device 7B from communicating on the data port 79. Accordingly, none of the software running on the computer 7 may access the communications link 7A.

By contrast, in the Network Connected state, the switch 7Z may enable the communications device 7B to communicate on the data port 79. Accordingly, software on the computer 7 may access the communications link 7A.

An exemplary use for the computer 7 is where a parent uses the computer 7 to access, say, his employer's computer network via a virtual private network (VPN) over the Internet 7A. The parent also wants his child to be able to use the computer 7 for school or recreation—but without access to the Internet 7A. The parent thus switches the computer 7 into the Network Enabled state when he (the parent) wants to use it, and switches the computer 7 into the Network Disconnected state when the child is to use the computer 7.

The switching of the data stores 72, 74 may be done under manual, hardware or software control. A mechanical switch thrown by the user when the user wishes to access (or cease accessing) the communications link 7A exemplifies a manual switch. A mechanical switch that may be locked with a key, for example, is preferable.

A switch 7Z that responds programmatically to the CPU 70 illustrates a software-controlled switch 7Z. (The CPU 70 may respond to any kind of input, including keystrokes, voice commands, biometric data and data received over a network.) A hardware switch 7Z may be considered as an analog computer.

A computer 7 running an operating system that supports hot swapping offers an advantage. The addition and removal of the communications device 7B from the computer 7 may confuse OSs that do not permit hot swapping of peripherals.

A Multi-Data Store Server

FIG. 8 illustrates a computer 8 incorporating an embodiment of the invention. The computer 8 may include a CPU 80, volatile memory 81, a peripheral controller 87, multiple non-volatile data stores 82a, 82b, . . . 82α, a data port 89, a communications link 8A and a bus 85, all well known in the art. The computer 8 may also include a data-store switch 8Z and a bus 86 consisting of the buses 861 or 862.

The bus 85 may communicatively couple the volatile memory 81, the peripheral controller 87 and the data port 89 to each other and to the CPU 80. The data port 89 may mediate access to the communications link 8A.

The peripheral controller 87 may communicatively couple with the data-store switch 8Z. The data-store switch 8Z in turn may communicatively or electrically couple to the data stores 82. The bus 861 may communicatively couple the data path of the switch 8Z to those of the data stores 82, and the bus 862 may electrically couple a power supply in or through the switch 8Z to the data stores 82.

The data port 89 may mediate access to the communications link 6A. The port 89 links the computer 8 to other communicators over the communications link 7A.

The computer 8 may operate in any of N states, where N is the number of data stores 82. In a first state, the data-store switch 8Z enables the first data store 82a to communicate with the peripheral controller 87. In the second state, the switch 8Z enables the second data store 82b to communicate with the peripheral controller 87, and in the Nth state, the switch 8Z enables the Nth data store 82α to communicate with the peripheral controller 87.

The corruption or other failure of the data store 82 currently communicating with the controller 87 prompts the switching from one state to another, and thus from the failed data store to another, working data store 82. (The failed data store 82 may then be repaired in place, or it may be removed and repaired, removed and replaced, or removed permanently.)

Where, for example, the computer 9 is a web server and the communications link 8A is the Internet, the multiple data stores 82 may provide resistance against infection and hacking by malicious users of the Internet 8A. If the hackers succeed in corrupting the data store currently attached to the peripheral controller, then a switching may occur from that corrupted data store 82 to another correct data store 82. This switching may occur very quickly (preferably as quickly as possible) in order to minimize the loss of access to the data on the data stores 82.

The switching may be manual, hardware or programmatic. For example, a diagnosis program may execute periodically to determine the health of the currently accessible data store 82.

A Computer Peripherals That Can Be Cycled

Figure 9A:
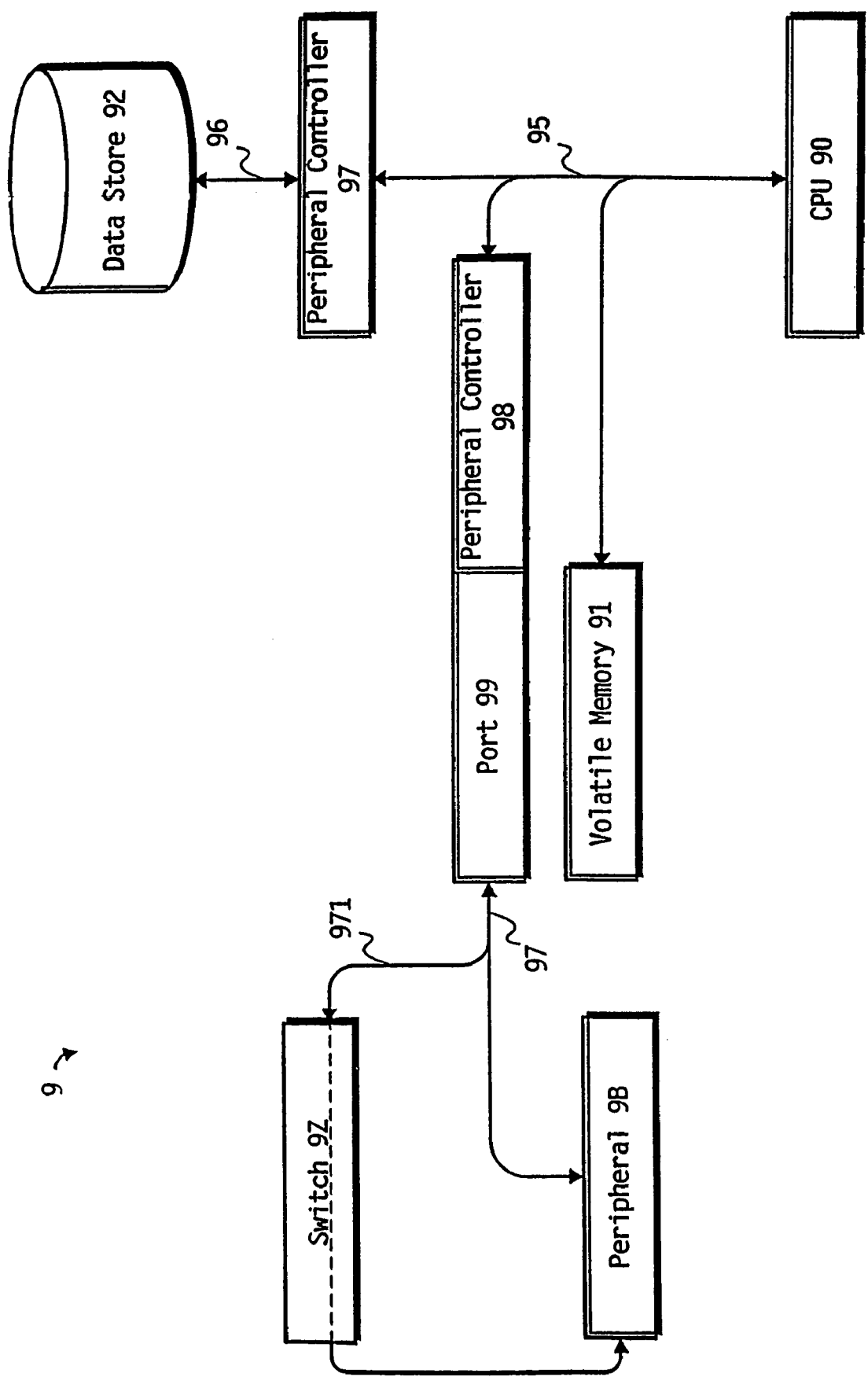
FIGS. 9A, 9B illustrate a computer incorporating embodiments of the invention.

FIG. 9A illustrates a computer 9 incorporating an embodiment of the invention. The computer 9 may include a CPU 90, volatile memory 91, a controllers 97, 98, a non-volatile data store 92, a port 99, a peripheral 9B and buses 95, 97, all well known in the art. The computer 9 may also include a switch 9Z.

The bus 95 may communicatively couple the volatile memory 91, the controllers 97, 98 to each other and to the CPU 90. The controller 97 may communicate with the data store 92. The controller 98 may communicate with the peripheral 9B.

The bus 97 may communicatively or electrically couple the port 99 (and thus the controller 98) to the peripheral 9B.

The peripheral 9B may be any computer peripheral. Examples include printers, USB devices, scanners, fax machines, data stores and keyboards.

The switch 9Z may switch a power line 971 of the bus 97, thus powering up or down the peripheral 9B. The switch 9Z may switch one or more data lines 972 of the bus 97, thus disabling or enabling the peripheral 9B to transfer data to the port 99.

A user of the computer 9 may be using the peripheral 9B, transmitting or receiving data on the from the device 9B as expected. The switch 9Z is supplying power to the peripheral 9B.

At some point, the computer 9 becomes unable to communicate with the peripheral 9B. This may be caused by an error in the software or hardware of the computer 9, including software or logic of the peripheral 9B.

The user attempts to revive communications with the peripheral 9B. The user may for example, cycle the power to the peripheral 9B. Thus, the user changes the state of the switch 9Z such that the switch 9Z goes from powering to the peripheral 9B, to not powering that peripheral 9B, to again powering that peripheral 9B. This switching may be done manually, in hardware, or programmatically.

The cycling of the peripheral 9B may resolve the communication problem that the user was experiencing. For example, where the problem was with the software or logic of the peripheral 9B, then the power cycling may clear the software or logic state of the peripheral 9B. Where the problem was with the software or logic of the computer 1, cycling the power may clear the software or logic state f the controller 97 or applications running in the memory 91.

Figure 9B:
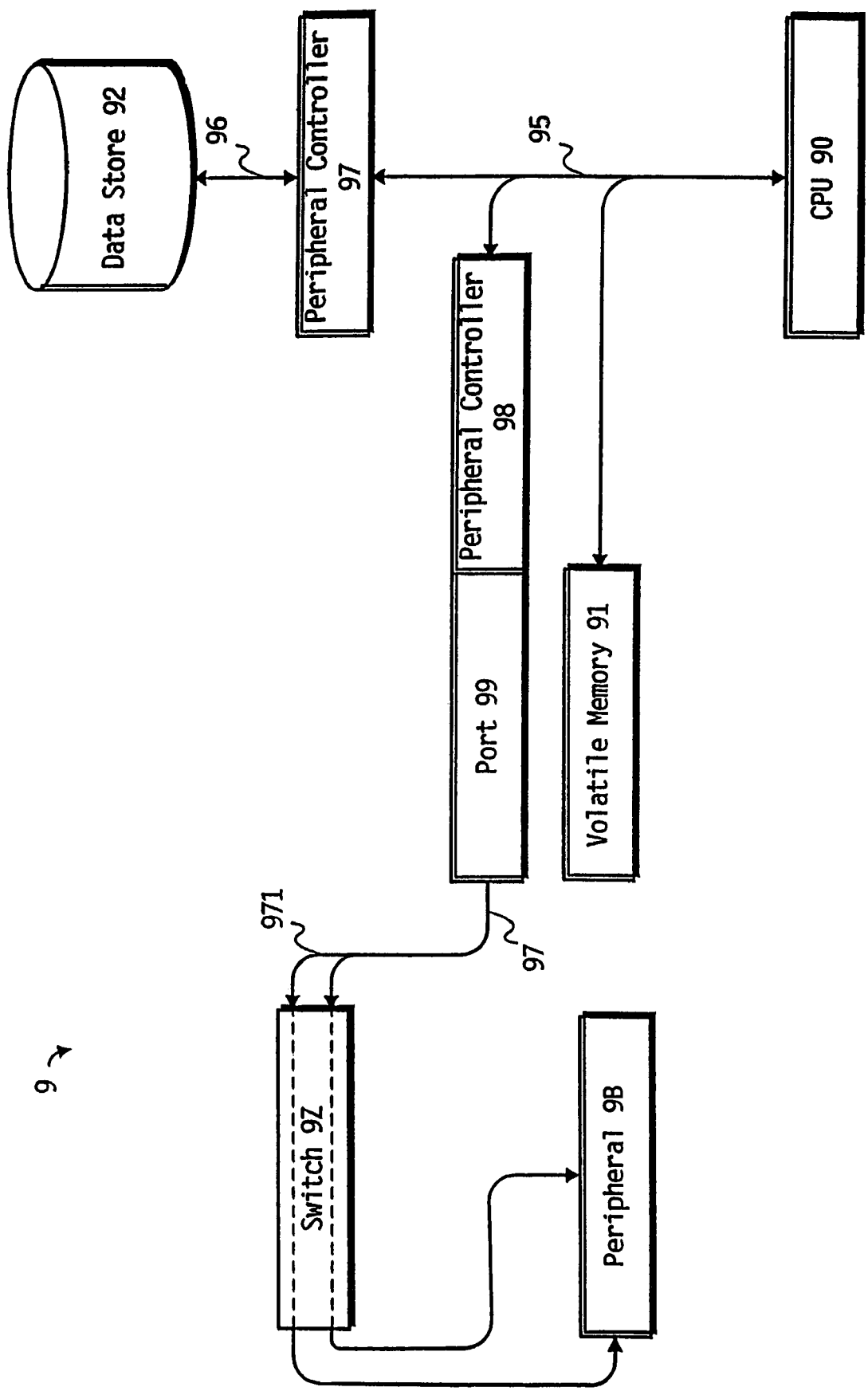

FIG. 9B illustrates an alternate embodiment of the computer 9. The switch 9Z switches both power and data lines.

A Multi-User Computer

Figure 5:
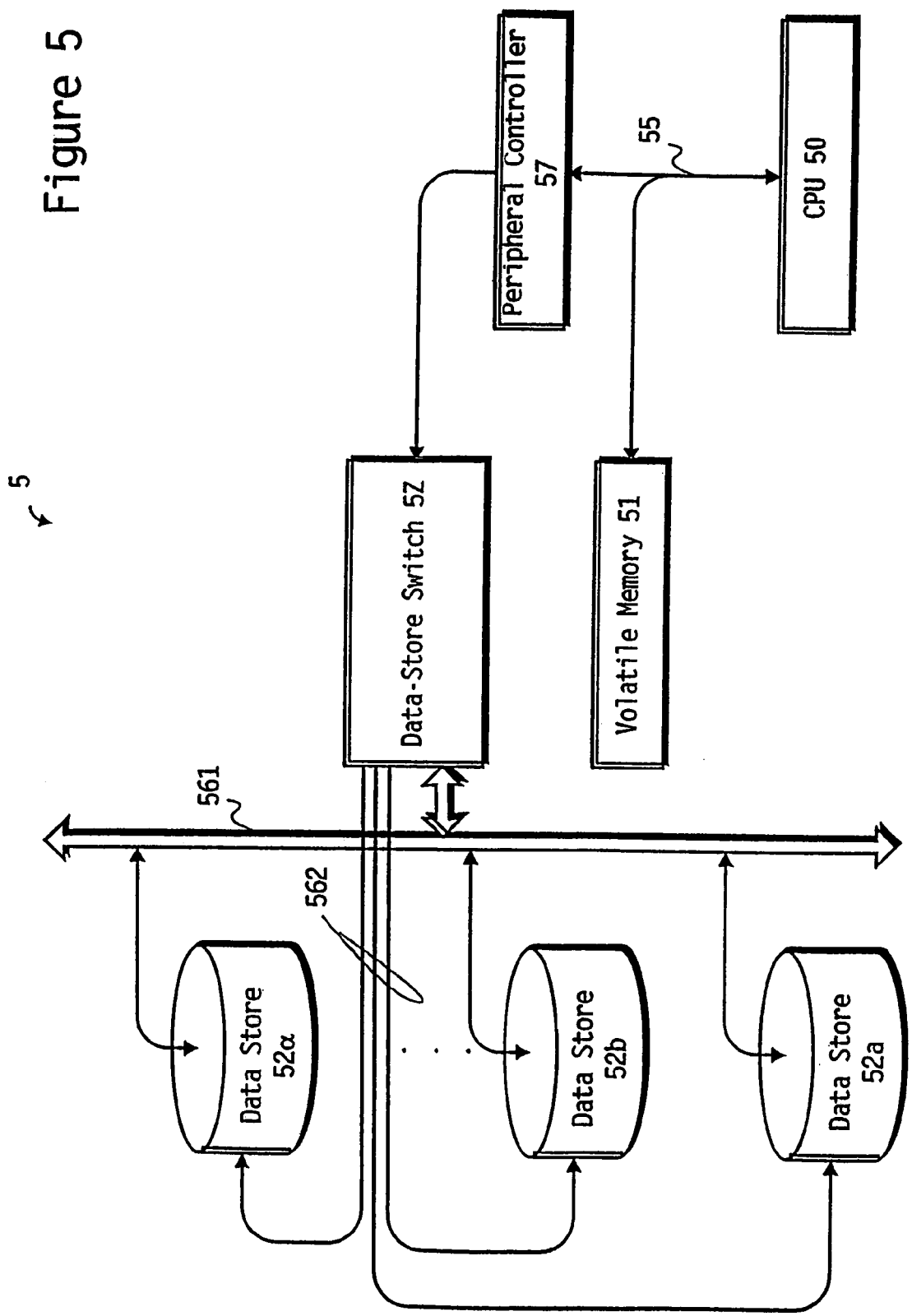
FIG. 5 illustrates a computer incorporating an embodiment of the invention.

FIG. 5 illustrates a computer 5 incorporating an embodiment of the invention. The computer 5 may include a CPU 50, volatile memory 51, a peripheral controller 57, multiple non-volatile data stores 52a, 52b, . . . 52α and a bus 55, all well known in the art. The computer 5 may also include a data-store switch 5Z and a bus 56 consisting of the buses 561 or 562.

The bus 55 may communicatively couple the volatile memory 51, the peripheral controller 57 and the data port 59 to each other and to the CPU 50.

The peripheral controller 57 may communicative with the data-store switch 5Z. The data-store switch 5Z in turn may communicatively or electrically couple with the data stores 52. The bus 561 may communicatively couple the data path of the switch 5Z to those of the data stores 52, and the bus 562 may electrically couple a power supply in or through the switch 5Z to the data stores 52.

The computer 5 may operate in any of N states, where N is the number of data stores 52. In a first state, the data-store switch 5Z enables the first data store 52a to communicate with the peripheral controller 57. In the second state, the switch 5Z enables the second data store 52b to communicate with the peripheral controller 57, and in the Nth state, the switch 5Z enables the Nth data store 52α to communicate with the peripheral controller 57. Only one data store 52 may access the peripheral controller 57 at any given time.

In one embodiment, the computer 5 has only one controller with multiple devices. In another embodiment, the computer 5' has multiple controllers, each with respective multiple peripherals. The switching then switches among the multiple peripherals of the first controller, the multiple peripherals of the second controller, etc. (The multiple controllers need not have the same number of multiple peripherals.)

Each data store 52 may contain self-contained software for a respective user or group of users. Each data store 52 may contain a bootable operating system, and optionally such application or data files as the user(s) corresponding to the data store 52 may require or desire.

Each user or group of users may use only a predetermined one (or more) of the data stores 52. Thus, before using the computer 5, a user sets the switch 5Z to the predetermined position enabling the data store 52 corresponding to that user to communicate via the controller 57.

In this way, a first user's data is separated from a second user's data on the same computer. The computer 5 more effectively separates user' data by enforcing security at a physical level rather than at the logical (software-enforced) level typical of multi-user operating systems.

In this scenario, re-booting between switches is desirable. Re-booting clears out the memory 51 in the switch from one user to another. Also desirable is a multi-key, multi-position lock. Any one key may turn the lock to any one predetermined position, enabling one corresponding data store 52.

The invention now being fully described, one of ordinary skill in the art will readily recognize many changes and modifications that can be made thereto without departing from the spirit of the appended claims. For example, in addition to switching software, data stores or other peripherals as described above, a computer may also switch properly functioning hardware for malfunctioning hardware. Indeed, in a computer with multiple mother boards, a switch may switch the functioning components of a computer from one board to another.

Also, while the description above usually uses data stores as the devices to switch, one of skill in the art will readily now realize that other computer components may be switched, including logic boards, ROM and controllers.

Under certain circumstances, danger or damage may follow from switching when power is supplied. Accordingly, a switch may be deactivated when such danger or damage may result. Logic such as the controller 1A may prevent dangerous or damaging switching by tracking power states, device identities, etc. and permitting switching, for example, when no electrical current is flowing to the devices to be switched.

Preferably, the switch is located in an easy-to-reach location. This contrasts with the typical location of USB, keyboard and other ports, for example.

On-The-Fly Repair Of A Computer

The following invention provides an apparatus and method of supporting the backup and recovery of a computing device. The computing device will typically include both a user computing environment and a supporting environment which enhances the stability and functionality of the user computer environment.

Processes

In one embodiment, a plurality of computing processes may be utilized to enable the On-the-Fly invention. Here, individual computing processes may monitor, track, predict the stability, backup, restore, or recover attributes within the user computing environment. The attributes may be software specific, data specific, operating system specific, or any combination. Utilization of the plurality of computing processes can facilitate the normal operation of the user computing environment. In one embodiment the user computing environment may be stabilized without user intervention such as requiring the user to shut-down, restart, logging off, logging on, or terminating applications. In one embodiment the supporting environment may have a capability interacting with the user computing environment. In one embodiment the supporting environment may be capable of initiating or causing the user computing environment to shut-down, restart, logging off, logging on, or terminating applications.

Different Computing Systems

In one embodiment the user computing environment and the supporting environment function in different computing systems. The two computing systems may reside in a common box. The user computing system may consist of data storage devices, RAM, processor, video card, and other attributes known in the art to facilitate a computing system. The supporting computing system may consist of a master template data storage device, RAM, processor, and other attributes known in the art to facilitate a computing system. In one embodiment, the data storage devices may be linked as needed to perform repairs. Such as, the need to copy data from the support environment to the user environment.

Snap-Shot of Data

In one embodiment, the present invention takes a snap-shot of the user computing environment. This snap-shot may subsequently be utilized to restore, analyze, or enhance the stability of the user environment. The snap-shot may include a stable image of the operating system, software applications, or user data. The snap-shot may contain an idealized or stable version of a disk drive utilized by the user environment, or a subset of the disk drive such as an individual partition. The snap-shot may also include an idealized version or image of the user system RAM, user system disk drive, user system partition image, memory of the video card, or any other memory stored or utilized in the user computing environment. These snapshots may be stored in the associated support environment data storage device Monitoring The supporting environment may monitor the user environment. The monitoring may include monitoring of processes running or enabled within the user environment. The monitoring may include monitoring both the utilization of the data storage device, data contained on the data storage device, and other aspect necessary for the normal operation of the user environment. This monitoring may facilitate identifying undesired changes, potential problems and also potential solutions. The supporting system may detect a freeze or other undesirable change within the user environment.

Recovery

When an undesirable change is detected in the user environment, the supporting environment may attempt to recover or restore or repair the user environment. The supporting system may be capable of re-enabling the user environment in a number of ways, such as resetting the keyboard in the event the keyboard locks the communication of keystrokes to the user environment. Further recovery of the user environment may be supported by reset connections such as describe by "Freezebuster", reset and clear devices as needed, replace defective software components as needed, and/or switch hardware components and/or devices as needed. The supporting environment and or supporting system may copy all or part of the data from one or more of the idealized snapshots mentioned above. These snapshots may be copied into their respective devices and/or locations.

Application Configuration

Another embodiment supports an ability to run two or more different programs at the same time on one computing system where the data and applications may be isolated from one another but may share output and/or input devices. In one embodiment, the applications may be isolated by executing the applications in a separate address space. The applications and data may be further isolated by utilizing two separated data storage devices. In order to safely send a command from one isolated data storage device to the other isolated data storage device the following may be utilized. In one embodiment, when an icon on the desktop icon is clicked the following may occur. The icon may execute a command that would launch a specific application on the other isolated data storage device. This may be accomplished by a shared ASIC that sends the command to the other isolated data storage device.

Another embodiment involves isolation of data with merged display. In this embodiment two user environments can be separated for the purposed of isolating data. For the AntiHacker System: A hard drive that does not contain "sensitive" data could be isolated and attached to a network. A second hard drive, may or may not be attached to the other hard drive (in any way), could be utilized for "sensitive" user data, but have no exposure to the network because it is "isolated" by a means of switching. The video signals associated with the data coming from these two hard drives could then be "merged" onto the same screen. In other words, all of the computing would be happening within isolated "secure zones" within a single computer but would not appear so to the user. Another example: the anti-virus system could use this method to isolate potentially infectious data.

Application Output

Applications may have its output displayed on the same screen alongside and/or superimposed upon the same screen with other applications and data that were being "computed" separately. Both computing processes may be separated but may then be "merged" together on the screen, and/or overlaid one another on the same screen. In one embodiment, this may be achieved by using multiple video cards. This concept can be applied for example to the Repair System, Multi User, Anti-Hacker, anti-theft and Anti-Virus.

In another embodiment both the user computing environment and the supporting environment will reside on a single computer system. A snap-shot of the operational user environment will be taken. The snap-shot will be associated with the supporting environment. Processes associated with the supporting environment will monitor the activities and status of the user computing environment. The monitoring function will become aware of any degraded performance of the user computing environment, such as a system freeze up. The monitoring function notifies the supporting environment of any degraded performance. The supporting environment will perform any recovery action as necessary to recover or restore the user environment. Recovery may include utilizing the snap-shot to recover or restore the user environment. An entire user disk may be restored. A specific application or software package may be restored, or particular files.

External Repair Of A Computer

The invention may back up or recover a computing device. The computing device may include a user computing environment and a supporting environment which stabilizes the functionality of the user computing environment. The invention may include one or more external devices or removable media.

Master Template

A master template may be a copy of data that represents an ideal state of a computer system or component of a computer system. The master template may be created by copying data from an operational computer system or component of a computer system. The computer system may be in an ideal state before creating a master template. An ideal state of a computer system may be represented by data that is accessible to the computer system. Data, within this context, may include an operating system (e.g., Linux, Unix, Windows 98), applications (e.g., WordPerfect, Microsoft Office), user data (e.g., operating system preferences, background images, created documents), and component data (e.g., BIOS, PRAM, EPROM). Data may also include any information accessible to the computer system, including local and remote data storage devices.

As an example, the master template for one computer system may include all of the information installed on that computer system, such as Windows 98 operating system, WordPerfect application, documents created by the user. The information may be installed across multiple hard drives accessible to the computer system. Additionally, the master template may include a copy or an ideal-state version of the BIOS settings.

A master template may represent a snapshot of a newly purchased computer system. The system is typically in an ideal state with an operating system and various applications pre-installed, thereby allowing a user to begin utilizing the computer system. For a particular user, the master template may represent an ideal state of a computer system, including, for example, an operating system, applications, and user customizations. A user customization may include the users prior selection of a picture or "jpg" image for a desktop background, such as a picture of the users pet.

Optionally, the master template may be created from a first computer system and subsequently may be used as a master template for a different computer system. An ideal state of the first computer is thereby transferred to a second computer system or any number of computer systems.

Backups

A backup is a copy of data that represents an information on a computer system or component of a computer system. The backup may be created by copying data from an operational computer system or component of a computer system. A backup of a computer system may include data that is accessible to the computer system. Data, within this context, may include an operating system (e.g., Linux, Unix, Windows 98), applications (e.g., WordPerfect, Microsoft Office), user data (e.g., operating system preferences, background images, created documents), and component data (e.g., BIOS, PRAM, EPROM). Data may also include any information accessible to the computer system, including local and remote data storage devices.

As an example, a backup for one computer system may include all of the information installed on that computer system, such as Windows 98 operating system, WordPerfect application, documents created by the user. The information may be installed across multiple hard drives accessible to the computer system. Additionally, the backup may include a copy or an ideal-state version of the BIOS settings.

An archive is a backup which typically may not be erased.

Data Storage Device

A data storage device includes memory devices, which are accessible to a computer system. A computer system is capable of accessing or storing data in a variety of memory devices. Memory device may include hard drives, RAM, ROM, EPROM, or BIOS. Memory devices store data (e.g., data or programs). User data is typically stored on disk drives, but may potentially be stored on any memory device. Typically, a computer system utilizes a variety of memory devices. For example, an operating system, applications and user data may be stored on a hard drive, a BIOS program may be stored in ROM, and BIOS data may be stored in a protected memory.

DSD

A "DSD" refers to a "data storage device."

Methods of External Attachment

Data Storage Device (DSD) may be an external device. A variety of protocols currently exist for utilizing exterrial devices. Some of the more prevalent protocols include TCP/IP, USB, USB 2, Firewire, IEEE 1394, PS/2, parallel, serial, PCMCIA, SCSI. Other protocols and method of connecting external devices to a computer system will be apparent to one skilled in the art. As an example, a SCSI hard disk and SCSI CDROM are memory devices that may be attached to a computer system. The computer system may then read or write to the external device.

Repair Process:

An automated process may repair a data storage device of a computer system. The repair process may include multiple programs. The automated process may be triggered by a particular event or a set of events. The repair process may be specific to a particular data storage device such as the primary boot partition of a hard drive. The repair process may encompass a variety of functions which may be modified, added, of skipped based on the type of repair or user preferences. The user may modify user preferences.

In one embodiment, the repair process represents a sequence of functions. Typically a Master Template is either provided to the user or created by the user. Backups are created intermittently. The computer system becomes unstable and repair becomes necessary. The user may activate the repair process or the repair process may recognize the instability or problems with the system and activate the repair process.

Prior to repair, a Master Template typically exists for the computer system. The Master Template may have been created in a number of different ways. Several ways of creating one or more Master Templates for this computer system include: shipped with a new computer, created with the installation of software (e.g., software to support this process), created by a user-activated program, periodically created of a Master Template by a program.

Backups typically exist for a computer system. A backup may include user data and programs which have been stored on a data storage device accessible to the computer system. For example, documents may have been created or modified by a user. These documents may be stored as a backup. The user may have installed additional programs that may be stored in a backup.

During a backup process data is copied from a data storage device of the computer system to the backup data storage device(s). Any data that is accessible to the computer system may be backed up. The backup may be compressed. Compression may reduce the amount of storage space required to hold the backup. Incremental backups may also be used. Incremental backups may reduce the time required to perform a backup and reduce the storage space required to store them. Backups may be stored as archives.

Repair Process is Activated and (Optionally May Be Confirmed):

The repair process may include a number of functions. The repair process may be initiated by a user, administrator, repair software, or repair hardware. The user may specifically initiate the process (e.g., double clicking on an icon of a graphical operating system). An administrator may initiate the process by communicating with the computer system over an internet connection such as TCP/IP. Repair software may initiate the process by utilizing a boot diskette or a separate boot partition on the hard drive. Repair hardware may initiate the process by sensing a frozen state of the operating system or hard disk, and subsequently initiating the repair process. Alternatively, the user may press a hardware switch which initiates a process to shutdown the machine, switch boot disks, and the subsequent startup may initiate the continuation of the repair process.

The repair process may be configured to allow the user to confirm the repair process in a number of scenarios. For example, before a DSD is reformatted the user may be requested to confirm the operation. The user may be allowed to halt the repair process.

The repair process may utilize a Master Template, Backup, Archive, various commands associated with an operating system, switching, and other programs, for repairing a computer system. For example, the repair process may format and partition a hard disk using an MS-DOS command, then copy a Master Template to the primary boot partition of the hard drive, then copy the latest Backup or Archive, then mark the primary boot partition as the active partition.

Any number of backups or archives may be used to restore the user DSD(s).

Command associated with an operating system may be used to reset or update DSD of the computer system. A DSD (e.g., PRAM, BIOS, or CMOS) may be updated through the use of commands associated with an operating system. Typically, MS-DOS commands may be used to download, save, reset, reset to the default, or update a BIOS version. For example, one step in the repair process may include booting into an MS-DOS partition, executing MS-DOS commands to update the BIOS of the computer system, then change the boot device and reboot the computer system to continue the repair process if necessary. Alternatively, the DSD (e.g., BIOS) may be set to a previously saved state. The previously saved state may be included as part of the Master Template, Backup, or an Archive.

The repair process may also be capable of managing DSDs. Managing DSDs may include testing, reformatting, analyzing, resetting, or determining bad blocks. Alternatively, the repair process may interact with other programs to provide management functionality of all or some DSDs. For example, the repair process may rely on operating system commands to format a DSD (e.g., a hard drive), but interact with a program to interact with another DSD (e.g., BIOS, PRAM).

The repair process may evaluate the present state of the computer system. As part of the analysis the repair process may determine or recommend a type of repair. For example, if the DSD (e.g., hard disk) is not responding then reformatting may be recommended. If only several files appear to be corrupted then the repair process may determine only those files need to be copied from a Master Template or a backup. Some or all of the data from a master template may be copied on to the DSD(s). Alternatively, the repair process may copy the entire master template to the DSD(s).

The repair process may perform a similar evaluation regarding how much of a backup needs to be copied. Some or all of the data from a backup may be copied on to the DSD(s). Alternatively, the repair process may copy the entire master template to the DSD(s).

Rebooting the computer system may be integrated into the repair process. Switching between boot devices may be integrated into the repair process. The repair process may switch the boot disk from hard disk 1 to hard disk 2. Power may be cycled such that hard disk 2 boots up as the active partition. A default program may be executed as part of the boot sequence to perform part of the repair process. Subsequently, the repair process may alter the hard disk 1, switch hard disk 1 to the active partition, and then reboot or cycle the power to initiate the booting of hard disk 1.

Some Exemplary Embodiments of External Device Embodiments

The repair process may be initiated or managed by an externally located device that may be communicative coupled to the computing device through, e.g., USB, Firewire, parallel, serial, PS/2, PCMCIA, or infrared. The external device may be the boot device.

An external boot device may be connected to the computer system with the boot device activating the repair process. The repair program may reside on the boot device or a second data storage device. The second data storage device may also be communicatively coupled to the computer system. The second data storage device may contain master templates, backups, or archives. The second data storage device may also contain the repair program or other programs which facilitate the repair process.

For example, an internal SCSI device "id 0" may be the default boot device. The repair process may switch the power to the SCSI device "id 0" OFF. The repair process may switch the power to an external SCSI device "id 0" ON. The repair process reboot the computer system by actuating a reset command (e.g., a mechanical device, a logic circuit). When the computer system reboots, the external SCSI device may be the boot device. The repair process may then continue as directed by part of the repair process on the external SCSI hard drive.

The repair process may include switching the device id's of a primary and secondary SCSI disk. In this second example, the internal SCSI drive may be "id 0" and the external SCSI drive may be "id 5". The repair process may change the internal SCSI device to "id 5" and the external SCSI device to "id 0". Switching of the SCSI device id's may be performed by the repair process (e.g., a mechanical device or a logic circuit, activated by the repair process).

In another embodiment, the BIOS may be modified to enable booting from an external device. The boot device may also be switched by updating the BIOS. Typically the BIOS defines the boot sequence. If the first boot device is not found, then an alternate boot device may be defined in the BIOS (e.g., the boot-device sequence is CDROM, A:, C:). The BIOS may be downloaded, modified, and restored. The BIOS may be updated (e.g., in place, via download-modification-upload) to change the boot identifier of a USB device, an IDE device, or other devices. The repair process may download a copy of the BIOS in a variety of ways. One example, includes booting into an MS-DOS mode, executing a program to save the current BIOS to a file. The BIOS file may be saved into a master template, backup or archive. Alternatively, the BIOS file may be modified by the repair process to change the boot sequence. If the BIOS file is updated then it must be loaded into the computer system to take effect. Effectively the boot sequence may be changed to another DSD, such as a second hard drive. The external SCSI disk with a specific "id" may become the "boot device". Another option involves storing multiple copies of the BIOS file, each having a different boot sequence, uploading the appropriate BIOS file may allow booting from a particular boot device (e.g., IDE hard drive partition 1, SCSI device "id 0", USB disk, Jaz drive, etc.). An external device may be the boot device and start or continue the repair process.

In another embodiment, a secondary boot device may be attached as an external Data Storage Device to a computer system (e.g., connect to a parallel port). This secondary boot device may activate or manage the repair process. The secondary boot device may contain programs to conduct processes such as reformatting another data storage device (e.g., internal or external hard drive), copying data from a Master Template, copying data from a backup or archive.

A program on the secondary boot device, or accessible to the secondary boot device, may be activated to create a master template, backup, or archive of and data accessible by the computer system (e.g., the user's main drive).

A program on the secondary boot device, or accessible to the secondary boot device, may be activated to repair a data storage device on the computer system (e.g., the user's main drive that needs to be repaired). In this scenario, the Master Template, Backup, or archive Data Storage Device(s) may be attached externally via USB, firewire, etc. The program may actively search for Master Templates, Backups, or archive DSD(s) and present the user with a list of options for restoring the computer system. Alternatively, the repair process may determine and select the best restore options and continue the repair process.

In another embodiment the repair process may be initiated by insertion of a floppy, cd, dvd, or use any other form of removable storage/memory or startup device, and rebooting the computer system. The removable storage/memory or startup device may boot if the BIOS boot sequence contains a sequence in which the boot order enables a removable media to act as the boot device. Booting from the removable media may trigger or activate an automated repair process (e.g., a program located on the removable media or an external device). Booting from the removable media may activate a mechanical device or program logic to initiate the repair process (e.g., switch hard disk device id's and initiate a reboot sequence to boot from another device to continue the repair process).

In another embodiment, a repair program or part of the repair process may be placed in a StorExecute, microcontroller, ASIC, etc. The repair program may activate a repair process. The repair program may include managing the repair process. Functions which may be performed include reformatting data storage device(s), switching between boot devices, switching electrical components within the computer system or external components, copying data to/from data storage device(s), (e.g., copying master templates, backups, etc, or any portion to another data storage device), and other repair functions. The repair process, may also be located, integrated, or embedded in an external device. A switch trigger that activates the repair process may also be located, integrated, or embedded in an external device.

In one embodiment, the startup device may be selected by a StoreExecute. Alternatively, a device identity may be assigned by a StoreExecute. The necessity to perform switching through the use of jumpers is thereby reduced. For example if a repair process is triggered, a StoreExecute may assign device identities to data storage devices or may decide which data storage device shall be used for the repair process, and which data storage device shall be used for boot data storage device if rebooting is utilized in the repair process.

In one embodiment during "on-the-fly" repairs, an external data storage device may be utilized for such things as the Master Template or backups, or for software used for the repair process.

In this embodiment, an external data storage device ("DSD") is attached to a typical personal computer that contains an internal data storage device. The internal DSD may be referred to as the "main user" data storage device. An external DSD may be attached via any available external connection.

Example of External Data Storage Device ("DSD") for Repairing a Computer:

In this example, a user attaches an external data storage device ("DSD") to a computer with any available external connection (e.g., Firewire, USB, SCSI, etc.). An external connection may include USB, USB 2, Firewire, IEEE 1394, PS/2, parallel, serial, PCMCIA, SCSI, and other protocols and method of communicating with an external device.

The user installs software on "main user" DSD that initiates a program to create a master template, and schedules Backups to execute every Friday morning. The master template is created by the program and stored on the external data storage device. Every Friday morning the repair process runs and stores a backup of additional information to the external data storage device.

A micro-controller and EPROM may be attached to the computer to perform part of the repair process. Attachment may be via any available external connection. The micro-controller and EPROM may be integrated into the external data storage device.

A switch trigger may be attached to the computer. Attachment may be via any available external connection. The switch trigger may be integrated into the external data storage device.

As another example, the main user data storage device is accidentally erased or damaged and that the computer system will not boot. The user decides to repair computer and initiates the repair process by activating a switch trigger, which initiates the following process:

The micro-controller may interrogate the BIOS of the computer system to determine its current boot up sequence. EPROM may store instructions for how to accomplish this.

The micro-controller may determine that it is necessary to alter the boot sequence so that the externally attached data storage device will become the boot device. The micro-controller and associated EPROM may flash the BIOS in order to accomplish this. The micro-controller may then send a command to computer to reboot the computer. When the computer reboots, it will reboot from the external data storage device.

Following the boot up, programs which are located on the external data storage device may execute the repair process as defined herein.

Backup Of A Computer

The invention may backup, maintain backups, or recover data associated with a computing system. The computing system may include any number of components including hardware and software, and any memory accessible to the computing system. The computing system may focus on a user computing system and potentially the supporting environment which stabilizes the functionality of the user computing system (e.g., operating system, BIOS, etc.). Typically data associated with the computing system is identified by a variety of characteristics, the data is stored as a backup, and subsequently data within the backup may be restored or used to evaluate an existing computing system.

Backups

Data has a number of characteristics, typically including availability for use in a computing system. Data may include one of more of any of the following: operating systems, application, user data, data residing in the computing system (e.g., hard disk, hard disk partition, RAM, ROM, BIOS, CMOS, EPROM, electronic serial numbers, etc.), applications residing in the computing system (e.g., sample listed above), and backups created or accessible. The term data may be used to describe a specific aspect of information for association with a backup process. A backup process may include identifying data and the characteristics of data, for backup, management, or restoration. Data may also refer to a backup or set of backups. By default the data to backup may represent all data on a given disk drive, a given disk partition, or a memory.

Characteristics of the data may include an indication of what data is part of the backup, how to access the data, where to backup the data, frequency of the backup, and type of backup. These characteristics may be used to define or identify specific data associated with a backup process. Specific implementations may vary according to what characteristics are associated with the backup process.

What data to include is limited by the accessibility of the data to the computing system. Specific data for inclusion in a backup may be predetermined or determined as part of the backup process. Predetermined identification of data to include in a given backup may be provided by a hardware or software manufacturer, or a user (e.g., system administrator). Predetermined set of data may provide an initial indication of what data to backup. An operating system may, for example, include a list of files and or directories associated with operating system functionality. Here the operating system may provide a predetermined list of files or associated data representing the operating system or identifying specific data to backup (e.g., list of uses, user preferences, passwords, windows registry file).

A hardware system may, for example, include a memory address range (e.g., RAM, ROM, EPROM, BIOS, etc.) that represents data that may be useful to backup for that system. The hardware system may also identify other data within the computing system that may be useful in the backup process (e.g., applications to extract or update a BIOS). Typically, the data identified is useful in the backup process, such as understanding the operation of the computing system or restoring data in the event of a failure or corrupted data. Data identified for backup may also have a variety of uses including cleaning up the computing system which may have limited disk space (e.g., verify the necessity of data in a current computing system) and restoring identified data.

Alternatively, what data to include in a given backup may be determined subsequent to the delivery of a computing system to a user. Data may be determined with installation of hardware or software, or during the normal course of utilizing the computing system. A determination may be made with the installation of hardware or software. The installation process may be actively engaged in identifying what data would be useful to the backup process. The installation process may interact with the backup process or tools to identify program files and data specific to a given installation. The location of user file may also be helpful to the backup process. The contents of a user directory may be marked by the backup process for inclusion in a periodic backup. Accessing data by an application may also be integrated into the backup process. One example includes added functionality, such that saving data (e.g., a files) by the application includes an indication to the backup process to backup that specific data. The installed application may add the saved user file to a list of files that should be include in a subsequent backup. If multiple users access the same computing system, the file to be included in a backup may include an ownership indication.

Data to include may be identified according to directories or specific files. For example, data to include may be identified by file type, file location, directory tree, of memory device. A selective backup may backup only data associated with a specific system component such as a disk drive or data storage device.

How to access the data may be an important characteristic of the backup. An important consideration may be required for accessing, storing, formatting, modifying, restoring, and updating data of the various components associated with a computing system. Not all data is readily accessible according to a well known process of accessing a hard drive. As described above, data may include any data accessible to the computing system. Typically, a piece of data is uniquely accessible according to a predefined process. The process for accessing information from a disk drive is readily appreciated by novice users.

For example, accessing BIOS data for backup may involve booting into a particular operating system (e.g., DOS 5.x), running a hardware-specific program which may verify the hardware compatibility, executing a second hardware-specific program which may copy the data (e.g., BIOS data) to a floppy disk. Updating the BIOS in the example may involve running another program to flash the BIOS. Both the old and new versions of the BIOS, and associated applications can be stored as data in a backup. Consequently, a restoration of the old BIOS can be incorporated into the backup process. Similarly, other data accessible to the computing system may be incorporated in to the backup process by analyzing the existing processes for managing data for specific components within the computing system.

Where a backup is stored may be predetermined or determined as part of the backup process. A manufacturer of the hardware or software may provide an initial predetermined backup storage area or an indication of another device where the backup is to be stored. An operating system may access a second data storage device such as a disk drive, a second partition, or a pre-allocated file (e.g., similar to a swap file). Backup data may be stored to this initial location. A Hardware system may, for example, include a second memory or an address range of a memory (e.g., RAM, ROM, EPROM, BIOS, etc.) that represents the default backup location. Optionally, the backup location may be another storage device within the computing system or accessible to the computing system (e.g., across an Ethernet, firewire, USB, etc.).

Frequency of the backup can be based on any of a number of factors associated with the data and computing system including: volatility of data, volatility of the computing system, importance, upgrade schedule, user projects, personal comfort level, past experience with similar environments, degree of user participation, etc. Backups can be scheduled at particular times and intervals based on these factors. Backups may be initiated by the hardware, software, or a user. Similarly, other activities on the backup process, such as maintenance and restoration, may be performed based on a given frequency.

Type of Backup

A variety of backup types may be supported. The types may include at least one of the following: full backup, selective backup, partial backup, master template, data modified since a prior backup, or based in part on a comparison with a prior backup (e.g., a prior backup, or a listing of the contents of a prior backup). The type of backup may be defined for all data included in the backup, or part of the data associated with the backup process. For example, a backup may include an operating system wherein only files associated with the operating system and files modified since a prior backup are included in a specific backup. The specific backup may further include a user data directory identified for backup.

Data Represented in a Backup

Data represented in a backup may be identified by the various characteristics described above. Typically, data represented in a backup supports a backup process, such as a possible restoration of the data for use in a computing system. The backup or the various data contained in the backup may be a compressed or encrypted. Specific data in the backup may be an exact duplicate or enough information that the data may be recreated, corrected, or verified. For example, file differences may be included in a backup, thereby allowing a set of backups to be utilized to recreate or correct a file or data. How to access the data may also be represented in a backup for certain types of data (e.g., BIOS) and not represented in a backup for other types of data (e.g., "c:\my docs\*.docs").

Data to be included in a given backup may identify by hardware, software, user, or other characteristic of the computing system. A computer manufacturer may create an initial backup of a standard installation, which may include various forms of data associated with a computing system. The manufacturer sells the computing system to a user and may provide a master template as a backup that represents the manufacturers initial computing system configuration. This saves the manufacturer time and money, and gives the user peace of mind. Subsequently the user may install additional software and thereafter create a partial backup of the changes to the computing system. A comparison may be performed between the master template and data associated with the current computing system. Difference between the two can be identified as the data for backup. Here, data that has been changed, added, or deleted, in comparison to data associated with a master template may be identified for backup. Consequently, the master template and a subsequent backup may be used, according to this example, to restore the computing system to the level of functionality associated with the subsequent backups. A variety of scenarios will be apparent to one skilled in the art.

Repair Process

Restoring

Data represented in a backup is typically restored to a computing system. Restoration may include the selection of at least one of the following: specific backup, group of backups, specific data contained within a backup, and a master template. The restoration may initially determine the difference between the current computing system and a prior backup. Characteristic associated with the identified data may be used in the backup process (e.g., restoration process associated with BIOS which may have been included in a backup.).

The selection of a master template, for example, may return the computing system to an idealized state as defined by the master template. A master template and other data may be identified to restore the computing system to a state associated with the last backup in combination with the identified master template (e.g., master template represent the state as purchased, and the identified backup represents the state after a user installed several applications). Alternatively, a master template may represent an upgrade to the computing system. This upgrade may be combined with other user backup to enhance the functionality of the computing system and maintain existing user data.

Selecting Data

Data associated with the backup may be identified similarly to the selection of data for inclusion in the backup, as described above. This information may also be utilized to determine what data or aspects of the data to restore (e.g., specific users files).

Data matching a certain file type, file location, data storage device, device, component, description, date, wild card matching, etc. may be identified for restoration. The selection may be performed by the hardware, software, user, or any component in the computing system. In the event of an operating system failure it may be more appropriate to allow hardware or software select data to restore.

Restoration location for data may be specified by a user, hardware, software, default, original location of the data, temporary location, an alternate location (e.g., for further analysis), or by any component of the computing system. For example, a user may elect to restore data with wild cards such as "*.doc" and "*.txt" from all backups. The "*.doc" files will be placed in a user-specified or default file location (e.g., "c:\documents folder\doc\"), and "*.txt" files will be placed in a user specified file location (e.g., "c:\documents folder\txt\"). Alternatively, the data (e.g., files in this example) may be restored to their original location which may be identified in the backup.

Preferences

Preferences may be associated with the backup process, and may include preferences of hardware, software, users or other components of a computing system. Preference may be defined as a set of default values associated with the computing system, hardware, software, or particular users. Configuration information and characteristics may be defined as preferences for each component of the computing system. A preference associated with a BIOS may include a process or program for accessing the BIOS in a specific manner, such as booting to DOS 5.x, executing a specific program to extract the BIOS. Preference may be changed by hardware, software, or users.

The preferences can be used to define data characteristics (including backups), restore characteristics, and manage data. Preferences may limit the interaction required with users during the backup process (e.g., selecting data or restoring data). A new user may establish preferences to limit interaction with a backup process. A seasoned veteran may establish preferences to provide a more robust control of the backup process or aspects of the backup process.

For example, the specific characteristics of how the backup process interacts with updating a BIOS may be of a greater interest to an experienced user rather than a novice. In another example, user preferences may dictate the interaction between the user and the restore. By default, the restoration process my provide the user with a push button restore, such that the computing system will control the entire restoration process. Alternative, the user may modify the preference such that a user response is required before specific aspects of the backup process are performed (e.g., format hard drive, or flash the BIOS).

Software may also have preferences, which may identify data associated with the software, when installed, serial number, and possibly an indication of the best way to backup, manage, and restore the software. Preferably, preference associated with hardware and software would minimize interaction required a by user in the process.

Initiating Restoration

The hardware, software, or user may initiate and may manage the repair process. Data matching a restoration criteria may be restored. Criteria for restoration may be base on the data stored in the backup (e.g., frequency, master template, compression, encryption, etc.). Further criteria for restoration may be based in part on the type of backup or current status of the computing system (e.g., functional, hard disk failure, BIOS failure, OS non-responsive, etc.) The current status may be determined in part through the utilization of hardware and software to monitor the health of the computing system. For example, hardware or software can monitor the computing system for any indication of a keyboard "freeze", and activate part of the backup process to return the computing system to a normal operating state. Utilization of hardware and software can be used to maintain the health of the computing system. Maintaining the health of a computing system may include determining backup process characteristics which may be based on user preferences. The frequency of backup may be a way to help ensure the computing system's health.

For example, an alternate boot sequence may be initially established in the BIOS such that the computing system initially attempts to boot from a primary disk drive and subsequently to a second drive. The second drive may contain software designed to boot the machine and evaluate the present condition of the computing system. Once the necessity of any repairs have been determined, the software may proceed to correct the malfunctions and return the computing system to a normal operating state. The software may then reboot the computing system to the normal operating state, thereby minimizing user involvement in the repair process.

Removing Data

During a restoration, process data may be removed including: deleted, moved, renamed, or altered. The method of removal may be specified as part of the data characteristics. The restoration process may require the computing system to reflect the data contained in a backup, and therefore necessitate the removal of some data. For example, in restoring data representative of an operating system, a preference may provide that existing inconsistent files may represent the culprits behind a malfunction predicating the restore process. Removing this additional data (files in this example) may be warranted. Removing extraneous data may be performed in a number of ways based in part on the type of restoration, preferences, characteristics of the backup or data, and the goals of the backup process (e.g., minimal user involvement). For example, if the goal is to restore the master template, then as part of a comparative restoration all data determined to be different from the master template may be removed to a specified data storage device or memory such as a default folder.

Restore Specific Data

The hardware, software, or user of a computer system may request the restoration of data. To facilitate the restoration of specific data a user may perform a restore based in part on: file type, creation date, user identification, modification data, backup date, or any characteristics of the data. For example, a completed restore may include a default folder that contains all data from the last backup which differs from data currently available for access to the computing system or some subset of all of the data (e.g., specified according to preferences). Alternatively, the folder may contain all data which differs when comparing two backups, such as the last backup and a master template. Data conforming to the users request may be sorted into different directories to provide the user with an indication of the information contained therein, such as "This is probably your stuff 2/25/03", "Is any of this your stuff? 2/25/03", and "Probably not your stuff2/25/03".

Managing Restored Data

Preferences may also control what happens to restored data. Data restored may be available to the user or the computing system for a limited duration, to reduce the amount of memory utilized by the computing system. For example a user definable preference may indicate that a dialog warning that the folders named "Is any of this your stuff?2/25/03" and "Probably not your stuff2/25/03" will be automatically deleted in 10 days and if the user desires data from those folders the data should be moved prior to the expiration date. Optionally, a preference may provide that after 10 days the contents specific folders may be moved to a temporary "trash" folder with a new expiration date of 30 days.

Placement of Restored Data

Placement of data may be defined in part by the data characteristics stored with the backup or data, the characteristics associated with the backup process, and the preferences. Data, such as user data, may be returned to an original location, and other data may be placed in a different location. For example, user data located on the desktop may be returned to where it was, whereas user data located in the system folder may be returned to its original location depending in part on preferences. Alternatively, user data may be deposited in a default or indicated location such as a "documents" folder, a "Your Stuff is In Here" folder, a "proposed trash" folder, a "trash" folder, or other custom locations.

Master Templates

A master template is a backup of data, representing a computing system according to an ideal state. The ideal state typically includes an operating system, a collection of applications or software. The data included in the master template may have been specifically chosen for a particular user and for a particular hardware configuration.

A master template may be created or updated according to a variety of approaches. One approaches involving a data storage device may include: 1. Creating several backups of data on a data storage device over time; 2. An activity associated with the backup process, such as a repair process is triggered; 3. A backup of user data files is performed (e.g., to save the users current work); 4. Existing data storage device (e.g., memory) may be reformatted or tested, and may be performed according to preferences for that data storage device; 5. The master template is copied to the user data storage device; 6. Backup of user data files is restored to the user data storage device. The computing system is thereby restored to a normal operating state with minimal user intervention.

The master template may also be updated, changed, or modified in a variety of ways including: by the user, by access to an update (e.g., an incremental release by a computer manufacture), or by access to a replacement master template, etc. The preferences associated with a master template may provide a method for performing these modification.

The master template may be tested to ensure the master template and the repair process functions as expected in the backup process, such as restoring the computing system This testing helps ensure the functionality of the master template, the restore process, and may also be used as a virus check and repair. An on-line service may be provided to detect virus, verify the integrity, or to update a master template.

Restoring

A backup may be tested to verify its integrity (e.g., with a checksum and verifying readability). If the backup is tested and fails, the user may change the preferences. The user may restart the repair process, select different preferences (e.g., applications or software), upgrade the backup (e.g., master template), and retest the backup. If the backup passes the verification tests, the user may accept the backup and continue with the restore. When a backup (e.g., master template) is accepted it can be copied from its storage location to a second backup (e.g., the new master template). The old master template(s) can be saved so that it is possible to revert back to prior master templates. After the user template is "accepted", the backup user data is returned to the user data storage device.

In one embodiment, a master template can be created by the user selecting to "boot into" a master template. The user may then make changes, install new software, make modifications, etc., and then exit. This approach allows the master template to be updated independently of user's documents and other data which may not be a beneficial to a master template.

In a different embodiment, the master template may be modified/updated by the user first conducting a repair of computing system. The repair process may automate 1. The backup of user files according to preferences, potentially including particular file types (e.g., documents); 2. the reformat of the user's primary disk drive or the restoring of the master template to the user's primary disk drive. The user may then install new software to an essential copy of the master template as present on the user's primary disk drive. A backup may subsequently be activated to generate a new master template version. A backup of the user's data (e.g., user specific documents) may then be restored to the computing system. Preferably, restoring the user specific documents is performed automatically.

The master template may be created by a process of selective copying. For example, depending on the particular OS in use, a program may interrogate the registry, determine what entries are associated with a particular program or application, and then choose to selectively copy only those files and entries associated with the particular program or application to the master template.

The foregoing descriptions of specific embodiments and best mode of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for a computing device repairing itself to operation after initiating booting from a first boot device disposed within a main computing device hardware box of the computing device, the method comprising the computer-executed steps of:

in response to receiving a signal in the computing device indicating a need for repair of the computing device during the booting from the first boot device or during any operating state, booting from a second boot device;

the second boot device storing software installed on said second boot device at anytime prior to booting from the second boot device;

protecting at least a portion of the software on the second boot device from further modification after installation;

the second boot device being physically present with the computing device prior to receiving the signal indicating a need for repair; and repairing software stored on the first boot device while operating from the second boot device and selectively either: (i) maintaining operation of the computing device from the second boot device to restore operation of the computing device during repairing of the software on the first boot device, or (ii) changing to operation of the computing device from the second boot device to the first boot device after the software has been repaired to restore operation of the computing device;

wherein the signal is generated by at least one of: (i) by a user altering the state of a physical switch different from an on-off switch of the computing device and exposed on an exterior surface of the computing device, or (ii) automatically generated by the computing device after detecting a need for a repair; and the step of protecting the second boot device comprising one of: (a) switching the second boot device to a state of unavailability; and (b) switching the second boot device to a read only state.

2. The method of claim 1, wherein before the step of repairing software the following step is performed; offering the user a choice of thoroughness of repair.

3. The method of claim 1 wherein the step of repairing software comprises: automatically repairing software on the first boot device.

4. The method of claim 3, wherein the step of automatically repairing software comprises: automatically repairing software on the first boot device without further direction from the user.

5. The method of claim 3, wherein the step of automatically repairing software comprises: repairing software on the first boot device according to preset preferences.

6. The method of claim 5, wherein the repairing according to preset preferences comprises repairing according to whether:
to recover data;
to run a virus check;
to reformat the first boot device;
to revert to a backup; or
to run diagnostics.

7. The method of claim 1, wherein the step of repairing software comprises:
reformatting the first boot device; and copying software onto the first boot device.

8. The method of claim 1, wherein the step of repairing software comprises:
resetting parameters in a persistent memory; and copying software onto the first boot device.

9. The method of claim 1, further comprising the step of: directing a user to re-boot from the first boot device.

10. The method of claim 1, wherein before the step of booting from the second boot device, the following step is performed: installing software onto the second boot device.

11. The method of claim 10, wherein the step of installing software onto the second boot device comprises one method from the following set of methods:
installing software onto the second boot device;
copying installed software onto the second boot device;
copying installation software onto the second boot device; and
writing onto the second boot device a version of an operating environment running as a result of the boot from the first boot device.

12. The method of claim 11, wherein the version of the operating environment comprises a template of an operating environment.

13. The method of claim 10, wherein after the step of installing and before the step of booting from the second boot device, the following step is performed: updating the software installed onto the second boot device.

14. The method of claim 10, wherein after the step of installing and before the step of booting from the second boot device, the following step is performed: protecting the second boot device from further modification.

15. The method of claim 1, wherein before the step of booting from the second boot device, the following step is performed: automatically monitoring an operating environment running as a result of the booting from the first boot device.

16. The method of claim 15, further comprising the steps of:
detecting an undesirable change in the operating environment; and
generating the signal indicating a need for repair in response to the detection.

17. The method of claim 1, further including performing a data backup.

18. The method of claim 17, further including performing a data restore from the data backup.

19. The method of claim 18, wherein the data backup includes creating a master template either before initial use of the computing device or after a period of use, and the restore from the backup involves the use of the master template.

20. A computing device that repairs itself to an operational status at any time during operation, the computing device comprising:
a computing device hardware box;
a bootable first boot device disposed within the computing device hardware box;
a bootable second boot device, the bootable boot device having software installed onto the second boot device at anytime prior to booting from the second boot device that is protected from further modification by at least one of (a) switching the second boot device to a state of unavailability; or (b) switching the second boot device to a read-only state;
a switching logic responsive to receiving a signal indicating a need for repair of the computing device during the booting or during any operating state, that controls booting of the computing device from the second boot device;
the second boot device being physically present within the computing device hardware box prior to receiving the signal indicating a need for repair; and
means for repairing software on the first boot device while booted from the second boot device that selectively either: (i) maintains operation of the computing device from the second boot device to restore operational status of the computing device during repairing of the software on the boot device, or (ii) changes to operation of the computing device from the second boot device to the first boot device after repair of the software to restore operational status of the computing device.

21. A computing device as in claim 20, further comprising a switch, different from an on-off switch of the computing device and exposed on an exterior surface of the computing device hardware box adapted to generate the signal when operated by an external user to alter the state of the switch.

22. A computing device as in claim 20, further comprising monitor and signal generation means within the computing device for monitoring operation or failure of operation of the computing device and adapted to generate the signal when a failure of operation is detected.

23. A computing device as in claim 20, wherein the first boot device comprises a first hard disk drive boot device.

24. A computing device as in claim 20, wherein the second boot device comprises a second hard disk drive boot device.

25. A computing device as in claim 20, wherein the first boot device comprises a first hard disk drive boot device and the second boot device comprises a second hard disk drive boot device.

* * * * *